(12) United States Patent
Liu

(10) Patent No.: US 11,250,589 B2
(45) Date of Patent: Feb. 15, 2022

(54) GENERAL MONOCULAR MACHINE VISION SYSTEM AND METHOD FOR IDENTIFYING LOCATIONS OF TARGET ELEMENTS

(71) Applicant: Chris Hsinlai Liu, Hillsboro, OR (US)

(72) Inventor: Chris Hsinlai Liu, Hillsboro, OR (US)

( * ) Notice: Subject to any disclaimer, the term of this patent is extended or adjusted under 35 U.S.C. 154(b) by 66 days.

(21) Appl. No.: 16/640,117

(22) PCT Filed: May 24, 2018

(86) PCT No.: PCT/SG2018/050254
§ 371 (c)(1),
(2) Date: Feb. 19, 2020

(87) PCT Pub. No.: WO2019/039997
PCT Pub. Date: Feb. 28, 2019

(65) Prior Publication Data
US 2021/0027488 A1    Jan. 28, 2021

(30) Foreign Application Priority Data

Aug. 25, 2017  (SG) .............................. 10201706981P
Nov. 17, 2017  (WO) ................ PCT/SG2017/050573
Dec. 28, 2017  (SG) .......................... 10201710867W

(51) Int. Cl.
*G06T 7/73* (2017.01)
*G06T 7/80* (2017.01)
(Continued)

(52) U.S. Cl.
CPC .......... *G06T 7/74* (2017.01); *G06K 19/06037* (2013.01); *G06T 7/60* (2013.01);
(Continued)

(58) Field of Classification Search
CPC .... G06T 7/74; G06T 7/80; G06T 7/60; G06T 2207/10024; G06T 2207/30204;
(Continued)

(56) References Cited

U.S. PATENT DOCUMENTS 4,753,569 A * 6/1988 Pryor .................. A01B 69/008
250/201.1
6,594,600 B1 * 7/2003 Arnoul ............... G01B 11/2755
382/154
(Continued)

FOREIGN PATENT DOCUMENTS

CN         102735235 A      10/2012

OTHER PUBLICATIONS

PCT Search Report & Written Opinion for PCT Application No. PCT/SG2018/050254 dated Aug. 8, 2018, 7 pages.
(Continued)

*Primary Examiner* — Kim Y Vu
*Assistant Examiner* — Molly Delaney
(74) *Attorney, Agent, or Firm* — Burns & Levinson LLP; Steven M. Mills

(57) ABSTRACT

The present document describe monocular machine vision systems and methods for determining locations of target elements when the three dimensional orientation of the monocular machine vision system relative to the target system is unknown. The machine vision system described herein captures and uses information gleaned from the captured target elements to determine the locations of these captured target elements relative to the vision system, or reversely, the location and orientation of the vision system relative to the target elements.

30 Claims, 14 Drawing Sheets

(51) Int. Cl.
*G06T 7/60* (2017.01)
*G06K 19/06* (2006.01)

(52) U.S. Cl.
CPC ...... *G06T 7/80* (2017.01); *G06T 2207/10024* (2013.01); *G06T 2207/30204* (2013.01)

(58) Field of Classification Search
CPC ............... G06K 19/06037; G06K 7/12; G06K 19/06131; G06K 19/0614; G01C 21/20
See application file for complete search history.

(56) References Cited

U.S. PATENT DOCUMENTS

| | | | | |
|---|---|---|---|---|
| 7,826,641 | B2* | 11/2010 | Mandella | G06T 7/73 |
| | | | | 382/106 |
| 2006/0008116 | A1* | 1/2006 | Kiraly | G06T 7/20 |
| | | | | 382/103 |
| 2007/0288135 | A1* | 12/2007 | Kidd | G01C 11/06 |
| | | | | 701/31.4 |
| 2012/0265698 | A1* | 10/2012 | Kidd | G01C 11/06 |
| | | | | 705/306 |
| 2012/0285024 | A1* | 11/2012 | Miller | G01C 11/04 |
| | | | | 33/1 A |
| 2013/0108116 | A1* | 5/2013 | Suzuki | G06T 7/75 |
| | | | | 382/106 |
| 2016/0140713 | A1* | 5/2016 | Martin | G06T 5/006 |
| | | | | 382/154 |
| 2016/0205341 | A1* | 7/2016 | Hollander | H04N 7/015 |
| | | | | 375/240.08 |
| 2016/0342856 | A1* | 11/2016 | Krenzer | G06T 7/337 |
| 2018/0300900 | A1* | 10/2018 | Wakai | G06T 7/80 |
| 2020/0007836 | A1* | 1/2020 | Matsuzawa | G06T 7/80 |

OTHER PUBLICATIONS

Meier L. et al., "PIXHAWK: A Micro Aerial Vehicle Design for Autonomous Flight Using Onboard Computer Vision", Autonomous Robots, Feb. 23, 2012, vol. 33, No. 1-2, pp. 21-39.

* cited by examiner (A)

(B)

(C)

(D)

Red Sampling Filter

Block Colour Identification

Example of a Syntatic Pattern Target Element (A)

Example of a Simplified Target Point with Signage (B)

(A)   (B)   (C)

Euler Angles
Angle between x and N: A
Angle between z and Z: B
Angle between N and X: G

GENERAL MONOCULAR MACHINE VISION SYSTEM AND METHOD FOR IDENTIFYING LOCATIONS OF TARGET ELEMENTS

CROSS REFERENCE TO RELATED APPLICATIONS

This application is a national stage application, filed under 35 U.S.C. § 371, of International Application No. PCT/SG2018/050254, filed May 24, 2018, which claims priority to SG 10201706981P, filed Aug. 25, 2017; PCT Application No. PCT/SG2017/050573, filed Nov. 17, 2017; and SG 10201710867W, filed Dec. 28, 2017, each of which is incorporated herein by reference in its entirety.

FIELD OF INVENTION

The present invention relates to the field of monocular machine vision systems and methods for determining locations of target elements when the three dimensional orientation of the monocular machine vision system relative to the target system is unknown. The machine vision system captures and uses information gleaned from the captured target elements to determine the locations of these captured target elements relative to the vision system, or reversely, the location and orientation of the vision system relative to the target elements.

SUMMARY OF PRIOR ART

Machines have been historically deployed to improve the efficiency of tasks performed by humans. In recent years, smart machines have been invented and such machines have been implemented such that the resulting symbioses between mankind and smart machines have become almost inseparable. One of the most important features that smart machines require is a vision system for determining its location within a particular area. Those skilled in the art have tried to address this problem by employing machine vision systems. However, such systems rely on complex image processing and expensive artificial intelligence systems to recreate the function performed by human eyes and brains to resolve statuses and positions of objects.

There are major issues on machine vision that have to be addressed before digital technologies may be employed across various fields with minimal errors, speedy handling, and increased efficiencies and reduced costs.

SUMMARY OF INVENTION

The above and other problems are solved and an advance in the art is made by systems and method provided by embodiments in accordance with the invention.

A first advantage of embodiments of systems and methods in accordance with the invention is its capabilities of response time and positioning accuracy on determining the locations of objects at close distance.

A second advantage of embodiments of systems and method in accordance with the invention is its employment of advanced electronics along with mature and simple components.

A third advantage of embodiments of systems and method in accordance with the invention is that the vertical axis or z-axis of the optical device does not need to be known. As long as the optical device is able to obtain the global locations of the target elements, the optical device is able to ascertain its own location in relation to the target elements.

A fourth advantage of the embodiments of system and method in accordance with the invention is that all correspondences and positions are derived from a single image from a single optical device without needing image to image or lens to lens adjustment. Note that all existing techniques on lens to lens or image to image adjustment can still work if and when needed.

According to a first aspect of the invention, a system for determining, in an optical device's three dimensional coordinate system, locations of target elements within the optical device's field of view is disclosed, the system comprising the optical device and a computing device communicatively coupled to the optical device. In this system, the optical device is being configured to capture images of four target elements whereby each target element forms a corner of a quadrilateral polygon, and obtain a set of constraining rules from the captured images; and generate a sensor output for each of the four target elements whereby each sensor output defines a two-dimensional representation of the captured image of the target element on the optical device's sensors. As for the computing device, the computing device is being configured to create a path of sight for each of the four target elements based on the sensor output generated for each of the target elements and data obtained from a calibration table, whereby each path of sight comprises a plurality of points in the optical device's three dimensional coordinate system that are linked with the associated target element's generated sensor output, whereby the data in the calibration table comprises a plurality of sensor outputs and their associated points in the optical device's three dimensional coordinate system relative to the optical device; and translate the sensor outputs for each of the four target elements into positions in the optical device's three dimensional coordinate system using the paths of sight generated for the four target elements, the set of constraining rules obtained from the captured images and data in the calibration table.

According to an embodiment of the first aspect of the disclosure, the calibration table was pre-generated by, positioning the optical device at a plurality of calibration positions from a target screen comprising a plurality of target centres, whereby at each calibration position, for each of the target centres on the target screen, the optical device: captures an image of the target centre and associates, in the calibration table, a two-dimensional representation of the captured image of the target centre on the optical device's sensor with a position of the target centre relative to the optical device, the position being defined as a location in the optical device's three dimensional coordinate system, whereby the optical device's location is defined as the optical device's three dimensional coordinate system's point of origin;

According to an embodiment of the first aspect of the disclosure, wherein shortest straight line distances between each of the target elements are derived from the set of constraining rules.

According to an embodiment of the first aspect of the disclosure, the translation of the sensor outputs for each of the four target elements into positions in the optical device's three dimensional coordinate system comprises the computing device being configured to: identify a point on each of the paths of sight whereby each shortest straight line distance between each of the points matches with an associated shortest straight line distance as derived from the set of constraining rules; and obtain the locations of the four target elements from the identified first, second, third and fourth points.

According to an embodiment of the first aspect of the disclosure, the identification of a point on each of the paths of sight comprises the computing device being configured to:

a) select a first point on a first path of sight whereby the first path of sight is associated with a first target element;

b) identify a second point on a second path of sight that has a shortest straight line distance that matches with an associated shortest straight line distance as derived from the set of constraining rules from the first point, whereby the second path of sight is associated with the second target element;

c) identify a third point on a third path of sight that has a shortest straight line distance that matches with an associated shortest straight line distance as derived from the set of constraining rules from the second point, whereby the third path of sight is associated with the third target element;

d) identify a fourth point on a fourth path of sight that has a shortest straight line distance that matches with an associated shortest straight line distance as derived from the set of constraining rules from the first point, whereby the fourth path of sight is associated with the fourth target element;

e) identify a minor third point on the third path of sight that has a shortest straight line distance that matches with an associated shortest straight line distance as derived from the set of constraining rules from the fourth point, and if the minor third point does not match with the third point, repeat steps (a)-(e) until a match is found, and when a match is found, and when a shortest distance between the first and the third point and a shortest distance between the second and the fourth point matches with associated shortest straight line distances as derived from the set of constraining rules, setting the first, second, third and fourth points as the identified points.

According to an embodiment of the first aspect of the disclosure, the quadrilateral polygon comprises a rectangle and the translation of the sensor outputs for each of the four target elements into positions in the optical device's three dimensional coordinate system comprises the computing device being configured to: identify a first point on a first path of sight and a second point of a second path of sight that has a unit vector between the first and second points, that matches with a unit vector between a third point on a third path of sight and a fourth point on a fourth path of sight, whereby a shortest straight line distance between the first and the fourth point matches with an associated shortest straight line distance as derived from the set of constraining rules and whereby the first and second target elements form a first side of the rectangle and the second and third target elements form a second side of the rectangle; and obtain the locations of the four target elements from the identified first, second, third and fourth points.

According to an embodiment of the first aspect of the disclosure, the set of constraining rules further comprises global locations of each of the target elements.

According to an embodiment of the first aspect of the disclosure, the global locations of each of the target elements are utilized to plot a first diagonal line between two of the four target elements and plot a second diagonal line between another two of the four target elements whereby a crossing point C comprises an intersection point between the first and second diagonal lines.

According to an embodiment of the first aspect of the disclosure, the translation of the sensor outputs for each of the four target elements into positions in the optical device's three dimensional coordinate system comprises the computing device being configured to: select a first, second and third path of sight and identify a point on each of the three selected paths of sight, whereby each shortest straight line distance between each of the first, second and third points matches with an associated shortest straight line distance as derived from the set of constraining rules; identify a fourth point based on a distance of the crossing point C from the first, second, third and fourth points; and when the fourth point has an associated sensor output that matches with the fourth path of sight, obtain the locations of the four target elements from the identified first, second, third and fourth points.

According to an embodiment of the first aspect of the disclosure, the computing device is further configured to employ location information relative to a global coordinate system in the constraining rules to extract positioning information about the optical device relative to the global coordinate system.

According to an embodiment of the first aspect of the disclosure, each target element comprises a marker pattern and a signage pattern whereby, the marker pattern further comprises a symmetrical geometrical feature whereby the feature's centre of symmetry defines a centre of the target element, and the signage pattern further comprises a series of indicia whereby a first shape denotes a first state and a second shape denotes a second state, the first and second states being used to represent binary characters.

According to an embodiment of the first aspect of the disclosure, each target element's marker pattern comprises at least a first colour and the optical device is provided with a first colour sampling filter for detecting the first colour.

According to an embodiment of the first aspect of the disclosure, a first set of data in the calibration table was pre-generated at an ambient temperature, and at least one additional set of data in the calibration table was pre-generated at another temperature, whereby the computing device being configured to translate the sensor outputs for each of the four target elements into positions in the optical device's three dimensional coordinate system using the paths of sight generated for the four target elements, the set of constraining rules obtained from the captured images and data in the calibration table, further comprises the computing device being configured to: compute gradients of thermal expansion based on the first and the at least one additional set of data in the calibration table; obtain an ambient temperature of the optical device; adjust the sensor outputs for each of the four target elements using the ambient temperature and the computed gradients of thermal expansion; and translate the adjusted outputs into the positions in the optical device's three dimensional coordinate system.

According to an embodiment of the first aspect of the disclosure, the optical device is being configured to generate the sensor output for each of the four target elements whereby each sensor output defines the two-dimensional representation of the captured image of the target element on the optical device's sensors comprises for each sensor output, the optical device being configured to: apply spatial interpretation to points in a region bounding points associated with the respective sensor output to define the points in decimal places if the points in the region only comprises integers.

According to an embodiment of the first aspect of the disclosure, the optical device is being configured to generate the sensor output for each of the four target elements whereby each sensor output defines the two-dimensional representation of the captured image of the target element on the optical device's sensors comprises for each sensor output, the optical device being configured to: identify a shape representing a center of the target element; determine the geometric center of the identified shape; assign x-axis and y-axis vector values to edges of the identified shape; and determine accumulated deviations along the x-axis and y-axis using the x-axis and y-axis vector values assigned to the edges of the identified shape.

According to an embodiment of the second aspect of the disclosure, a method for determining, in an optical device's three dimensional coordinate system, locations of target elements within the optical device's field of view, the optical device being communicatively coupled to a computing device is disclosed, the method comprising: capturing, using the optical device, images of four target elements whereby each target element forms a corner of a quadrilateral polygon, and obtain a set of constraining rules from the captured images, and generating a sensor output for each of the four target elements whereby each sensor output defines a two-dimensional representation of the captured image of the target element on the optical device's sensors; creating, using the computing device, a path of sight for each of the four target elements based on the sensor output generated for each of the target elements and data obtained from a calibration table, whereby each path of sight comprises a plurality of points in the optical device's three dimensional coordinate system that are linked with the associated target element's generated sensor output, whereby the data in the calibration table comprises a plurality of sensor outputs and their associated points in the optical device's three dimensional coordinate system relative to the optical device; and translating the sensor outputs for each of the four target elements into positions in the optical device's three dimensional coordinate system using the paths of sight generated for the four target elements, the set of constraining rules obtained from the captured images and data in the calibration table.

According to an embodiment of the second aspect of the disclosure, the calibration table was pre-generated by, positioning the optical device at a plurality of calibration positions from a target screen comprising a plurality of target centres, whereby at each calibration position, for each of the target centres on the target screen, the optical device: captures an image of the target centre and associates, in the calibration table, a two-dimensional representation of the captured image of the target centre on the optical device's sensor with a position of the target centre relative to the optical device, the position being defined as a location in the optical device's three dimensional coordinate system, whereby the optical device's location is defined as the optical device's three dimensional coordinate system's point of origin.

According to an embodiment of the second aspect of the disclosure, wherein shortest straight line distances between each of the target elements are derived from the set of constraining rules.

According to an embodiment of the second aspect of the disclosure, the translating of the sensor outputs for each of the four target elements into positions in the optical device's three dimensional coordinate system comprises: identifying, using the computing device, a point on each of the paths of sight whereby each shortest straight line distance between each of the points matches with an associated shortest straight line distance as derived from the set of constraining rules; and obtaining the locations of the four target elements from the identified first, second, third and fourth points.

According to an embodiment of the second aspect of the disclosure, the identifying the point on each of the paths of sight by the computing device comprises:

a) selecting a first point on a first path of sight whereby the first path of sight is associated with a first target element;

b) identifying a second point on a second path of sight that has a shortest straight line distance that matches with an associated shortest straight line distance as derived from the set of constraining rules from the first point, whereby the second path of sight is associated with the second target element;

c) identifying a third point on a third path of sight that has a shortest straight line distance that matches with an associated shortest straight line distance as derived from the set of constraining rules from the second point, whereby the third path of sight is associated with the third target element;

d) identifying a fourth point on a fourth path of sight that has a shortest straight line distance that matches with an associated shortest straight line distance as derived from the set of constraining rules from the first point, whereby the fourth path of sight is associated with the fourth target element;

e) identifying a minor third point on the third path of sight that has a shortest straight line distance that matches with an associated shortest straight line distance as derived from the set of constraining rules from the fourth point, and if the minor third point does not match with the third point, repeat steps (a)-(e) until a match is found, and when a match is found, and when a shortest distance between the first and the third point and a shortest distance between the second and the fourth point matches with associated shortest straight line distances as derived from the set of constraining rules, setting the first, second, third and fourth points as the identified points.

According to an embodiment of the second aspect of the disclosure, the quadrilateral polygon comprises a rectangle and the translating the sensor outputs for each of the four target elements into positions in the optical device's three dimensional coordinate system by the computing device comprises: identifying a first point on a first path of sight and a second point of a second path of sight that has a unit vector between the first and second points, that matches with a unit vector between a third point on a third path of sight and a fourth point on a fourth path of sight, whereby a shortest straight line distance between the first and the fourth point matches with an associated shortest straight line distance as derived from the set of constraining rules and whereby the first and second target elements form a first side of the rectangle and the second and third target elements form a second side of the rectangle; and obtaining the locations of the four target elements from the identified first, second, third and fourth points.

According to an embodiment of the second aspect of the disclosure, the set of constraining rules further comprises global locations of each of the target elements.

According to an embodiment of the second aspect of the disclosure, the global locations of each of the target elements are utilized to plot a first diagonal line between two of the four target elements and plot a second diagonal line between another two of the four target elements whereby a crossing point C comprises an intersection point between the first and second diagonal lines.

According to an embodiment of the second aspect of the disclosure, the translating the sensor outputs for each of the four target elements into positions in the optical device's three dimensional coordinate system by the computing device comprises: selecting a first, second and third path of sight and identifying a point on each of the three selected paths of sight, whereby each shortest straight line distance between each of the first, second and third points matches with an associated shortest straight line distance as derived from the set of constraining rules; identifying a fourth point based on a distance of the crossing point C from the first, second, third and fourth points; and when the fourth point has an associated sensor output that matches with the fourth path of sight, obtaining the locations of the four target elements from the identified first, second, third and fourth points.

According to an embodiment of the second aspect of the disclosure, the computing device is further configured to employ location information relative to a global coordinate system in the constraining rules to extract positioning information about the optical device relative to the global coordinate system.

According to an embodiment of the second aspect of the disclosure, each target element comprises a marker pattern and a signage pattern whereby, the marker pattern further comprises a symmetrical geometrical feature whereby the feature's centre of symmetry defines a centre of the target element, and the signage pattern further comprises a series of indicia whereby a first shape denotes a first state and a second shape denotes a second state, the first and second states being used to represent binary characters.

According to an embodiment of the second aspect of the disclosure, each target element's marker pattern comprises at least a first colour and the optical device is provided with a first colour sampling filter for detecting the first colour.

According to an embodiment of the second aspect of the disclosure, a first set of data in the calibration table was pre-generated at an ambient temperature, and at least one additional set of data in the calibration table was pre-generated at another temperature, whereby the computing device being configured to translate the sensor outputs for each of the four target elements into positions in the optical device's three dimensional coordinate system using the paths of sight generated for the four target elements, the set of constraining rules obtained from the captured images and data in the calibration table, further comprises: computing gradients of thermal expansion based on the first and the at least one additional set of data in the calibration table; obtaining an ambient temperature of the optical device; adjusting the sensor outputs for each of the four target elements using the ambient temperature and the computed gradients of thermal expansion; and translating the adjusted outputs into the positions in the optical device's three dimensional coordinate system.

According to an embodiment of the second aspect of the disclosure, the generating, by the optical device, the sensor output for each of the four target elements whereby each sensor output defines the two-dimensional representation of the captured image of the target element on the optical device's sensors, the method comprises, for each sensor output: applying spatial interpretation to points in a region bounding points associated with the respective sensor output to define the points in decimal places if the points in the region only comprises integers.

According to an embodiment of the second aspect of the disclosure, the generating, by the optical device, the sensor output for each of the four target elements whereby each sensor output defines the two-dimensional representation of the captured image of the target element on the optical device's sensors, the method comprises, for each sensor output: identifying a shape representing a centre of the target element; determining the geometric centre of the identified shape; assigning x-axis and y-axis vector values to edges of the identified shape; and determining accumulated deviations along the x-axis and y-axis using the x-axis and y-axis vector values assigned to the edges of the identified shape.

BRIEF DESCRIPTION OF THE DRAWINGS

The above and other problems are solved by features and advantages of a system and method in accordance with the present invention described in the detailed description and shown in the following drawings.

DETAILED DESCRIPTION

Figure 1:
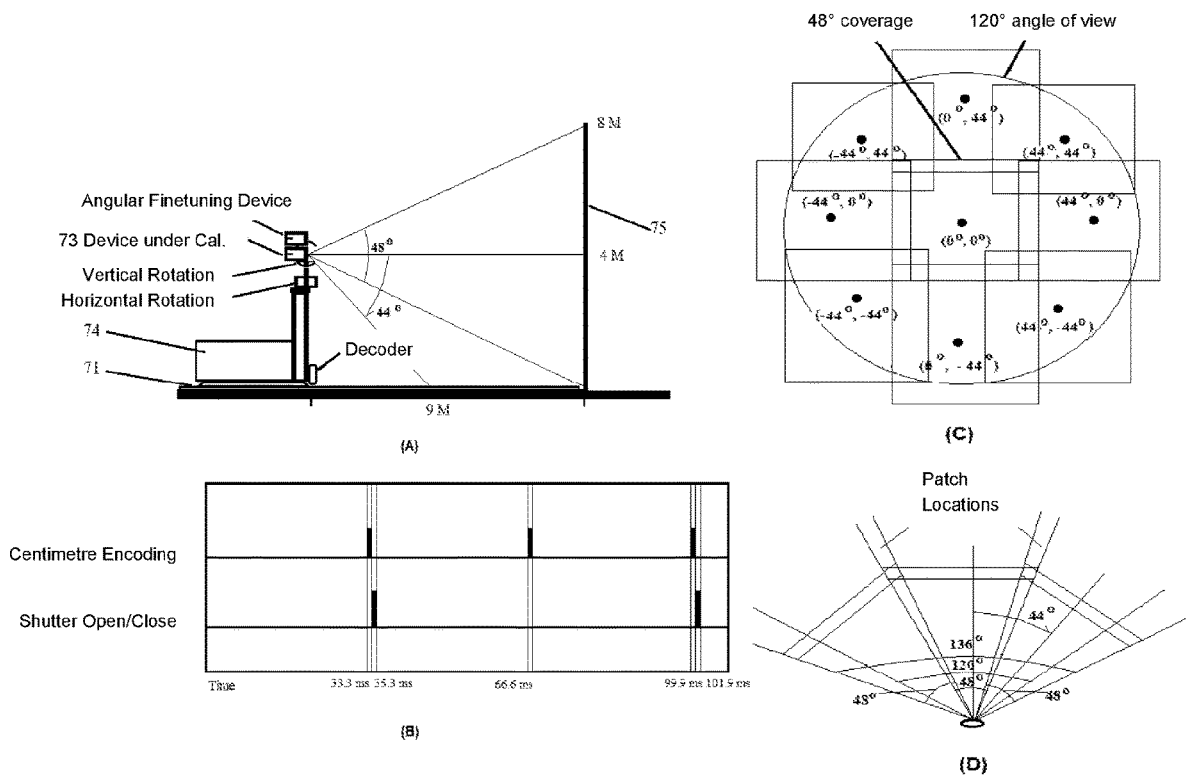
FIG. 1 illustrating a setup for the calibration of an optical device in accordance with embodiments of the invention.

This invention relates to a general monocular machine vision system that may be implemented without the prerequisite knowledge of an optical device's relative 3 dimensional orientation to the target elements.

For initial implementations, this invention may be applied in modern warehouse and factory settings. In such an implementation, a helmet worn by an operator in such a location may have an optical device that incorporates the machine vision system described herein. The optical device may then be used to assist the operator in determining his own whereabouts and will allow a system administrator to obtain the location of the operator within the warehouse or factory. The invention may also be applied to indoor drones to navigate the "air strait" on top of the aisles in a warehouse or factory as the drones are carrying out their transfer duties. In addition to the above, the invention may also be applied to ground travelling vehicles (auto piloted or driven) and machines. Note that this invention provides a robust solution for the navigation of ground travelling vehicles and machines regardless of the ground flatness, floor slope and variations due to the leaning of the device.

There are two types of information that may be extracted from the invented machine vision system and this information relates to positions and codes. With regard to the positions, the current implementation expects to process a limited range of expected scenes that are quasi-stationary. The machine vision system captures close range three-dimensional scene, together with expected target elements affixed in advance. The main task for the machine vision system is to then identify the target elements and to obtain the positions of the identified target elements relative to the machine vision system's optical device. Sub-unit-length pixelated interpretation and spatial interpretation are employed to increase the positioning accuracy. Smart methods are employed to obtain positioning information of all target elements within the field of view in several milliseconds.

With regard to the codes, signage comprising machine Braille code is described in detail in the following sections, and these signages provide essential information to the machine vision system. In fact, each target element can be considered to comprise of two parts, a first part having a marker pattern that includes a target centre position and a signage pattern that includes machine Braille code. The code in the signage pattern not only includes position related information, but also acts as authentication means to verify the authenticity of a target element. Typically, multiple target elements will be affixed onto moving objects and fixed structures. This is done to ensure that a group of targets may be employed for positioning and orientation purposes and to ensure that the functioning of the machine vision system is not compromised when certain target elements are missing or are obstructed. For example, such a situation will frequently occur when target elements are provided at ground level.

In a preferred embodiment, the range of the machine vision is up to 9 meters from the optical detectors, and a positioning resolution of 1 to 5 cm is typically achievable depending on implementations. The image resolution may be 4 k to 8 k and locations of target elements are derived at the frame rate of 30 times per second.

It should be appreciated that the described general monocular machine vision solutions can be applied toward any navigation processes including any traditional tasks that may be carried out using computer vision. This invention is not restricted to warehouse or factory settings only and can be employed in various other areas.

Optical Device Calibration

Individual optical devices, such as, but not limited to, an optical device having conventional image sensors (charge coupled device image sensors, complementary metal-oxide semiconductor sensors, etc.) which react to refracted light rays from individual optical lens in its own unique intrinsic manner may be utilized as the optical devices in the machine vision system.

In accordance with embodiments of the invention, the machine vision method is initiated by calibrating an optical device as follows. A plurality of target points is first provided in front of the optical device in a 3-dimensional range of interest. The sensor array of the optical device is divided into grids whereby the position of each grid on the sensor array may be defined using (s, t) values. It should be noted that while the centres of the grids can best be labelled with integer numbers, the s and t values that represent centres of target point may include non-integer numbers (such as decimals).

The calibration process then begins when the optical device captures an image of a target point in front of the optical device. When this happens, the image of the centre of the target point will be detected by the optical device's sensor array. It should be noted that the captured image may not necessarily be contained within a single grid on the sensor array and may instead be spread out across a few grids or part of a grid, depending on the size of the captured image. Hence, under the assumption that only part of a grid detected the captured image, a two-dimensional location in the sensor array that best corresponds to the centre of the captured target point is then recorded and this is repeated for all the target points until non-integer values of s and t have been assigned to all the points at discrete locations of say, every 2 centimetres, or every 8 cubic centimetres within the 3 dimensional field of view of the optical device. Such s and t values would typically comprise a small fraction of an integer and this allows the subsequent identification method to result in much finer readings than when spatial interpolation is carried out to obtain the precise locations of target points.

An embodiment of the calibration of an optical device for providing the positioning information of target points is shown in FIG. 1 (A). This figure illustrates an optical device that is to be calibrated, being mounted on a vehicle 74 through a 2 dimensional precision rotating stage. The vehicle 74 rides on sliding precision rail 71 with or without ball bearings. A calibration screen 73 having target centres or target elements that comprise a plurality of target points 79 surrounding a centre of screen pattern 77 is then presented to the optical device that is to be calibrated (see FIG. 2).

In embodiments of the invention, the calibration screen 75 utilizes a screen of 8 m wide and 8 m tall. Such a screen is employed because a typical warehouse would have walls that are 8 metres tall and 10 meters wide in between floors and pillars. These walls may then be conveniently employed to support the calibration screen. One skilled in the art will recognize that the size of the screen may be increased or decreased as required and does not limit the invention in any way. For wide angle applications, the double rotation stage allows the optical device to be rotated to various precision angles in 2 orientation dimensions to record the calibration values into the calibration table. In the current implementation whereby the optical device has a viewing angle of 120°, a 9 metre depth of view and an 8 metre calibration screen, there needs to be 3 vertical angles and 3 horizontal angles, with 9 angular positions to cover the full range of the viewing angle of 120° as shown in FIG. 1 (C). The three angles are −44°, 0°, 44°, respectively for the horizontal and vertical rotation stage, where the centre of each rectangular coverage is indicated by the horizontal and vertical rotation stage angle values, respectively. There shall be one full range of calibration for each of the 9 angular positions. FIG. 1 (B) demonstrates how an optical device shutter is timed by the position decoder (of FIG. 1 (A)) to record snapshot of the calibration screen while travelling at 30 centimetres per second. Every lens needs to be calibrated by this relatively costly facility, with a full range pass for each of the 9 angular positions. If the calibration is done with vehicle 74 stopping precisely every 2 centimetres, the total required calibration time would be around 6 hours. Calibration with vehicle moving at 30 cm per second shall cut the total calibration time to 15 minutes. When shutter is synchronised with 1 milliseconds exposure time, the distance travelled during the exposure is 0.3 millimetres, which is within the specification for negligible distance.

Precision rotation stages with 0.002 degrees resolution are employed so that any shifting that occurs due to angular variation is also limited to 0.3 millimetres, within the specification for negligible distance. The overlapping areas are fed with calibration values as many as 4 times, as shown in FIGS. 1 (C) and (D). The simplest "patch" is to use the average values of all 2 to 4 entries in the overlapping areas.

Of particular importance is the 3 dimensional location of a target centre relative to the x, y, z axes of the optical device. Distance variations on the rail and angle changes by the 2-D rotation stage can be visualized as the shifting of the location of the calibration screen relative to the optical device.

The above paragraph describes how having a 0.002 degree resolution for rotation stage maintains 0.3 millimetre location precision 9 metres away. However, it has not accounted for the vertical variations for horizon rotation and the horizontal variation for vertical rotation. Such variations are normally not accounted for and not included in the specifications of most rotation stage products. It is assumed that such a variance can be an order of magnitude larger than the 0.002 degrees. Such a variation may be addressed by "fine tuning" the measurement through the use of a reference lens that is permanently installed on the fixture. The 9 standard angular positions are fine-tuned by fine angular adjustments (every 0.002 degrees) such that the lens permanently installed on the fixture shall read the same (s, t) values for the centre of the calibration screen as those at the time of initial installation, at 9 metres distance for each of the 9 angular positions, respectively. The monotonicity property makes it easy to know the direction of actuation on both rotation stages. This only needs to be done once after the optical device is mounted to be calibrated and for each of the following 8 angular position change. Note that the optical device mounting errors are also cancelled out by this fine-tuning process. The third dimension, the distance from the lens to the calibration screen, implemented with the precision rail system, requires careful treatments. The goal is to keep the fixture centred onto the 9 angular positions within 0.5 millimetres accuracy at all distance during the whole travelling distance for calibration, at speed of up to 30 centimetres per second. When the vehicle is implemented to be 180 centimetres long, a linear sliding rail system under ISO Limits and Fits standard of H7/h6, with 0.025 millimetres accumulated worst case tolerance can be employed. The front plus rear accumulated worst case tolerance enlarging 5 times comes to 0.5 millimetres, which satisfies the requirement. The installation of a linear rail with "h6 specification" is costly but implementable. Note that the tolerance specification for the majority portion of the rail that is closer to the calibration screen can be relaxed.

Typically, an image captured by a wide angle camera is not linear, and the positioning conversions are also complicated. As such, the multiple dimensional computation issue is resolved with use of the calibration table. The use of such a table negates the need for conventional non-linear and complicated calculations for each individual optical device.

Figure 2:
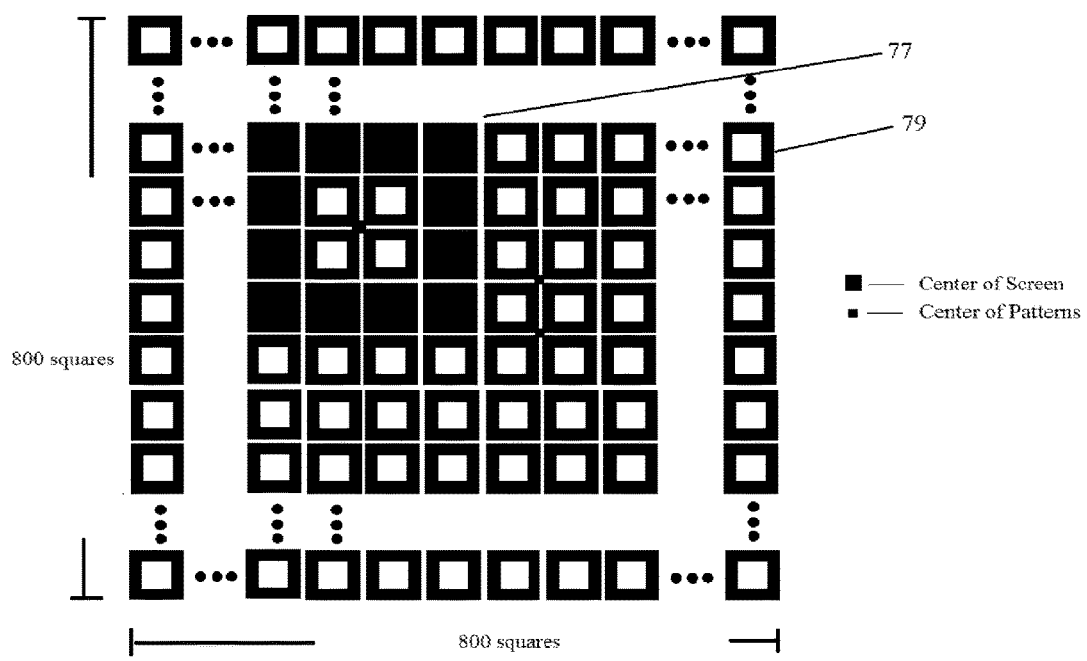
FIG. 2 illustrating a calibration screen used in the calibration setup shown in FIG. 1 in accordance with embodiments of the invention.

The patterns on the target screen are illustrated in FIG. 2 with the centre of screen pattern 77 being represented by a small rectangle surrounded by white squares which are in turn surrounded by black squares. This centre of screen 77 is then surrounded by target points represented by squares 79. One skilled in the art will recognize that the centre of screen pattern 77 and the target points' squares 79 may be replaced by other geometrical shapes without departing from this invention. Further, one skilled in the art will recognize that although FIG. 2 only illustrates about a hundred target points as represented by the squares, multiple centres of screens and much more target points may be provided on the target screen without departing from the invention. In embodiments of the invention, there should be upwards of 640,000 target points provided on the target screen.

While it seems hard to display the 2 dimensional location information on the calibration screen, such information is obtained by counting. As stated in the embodiment above, a single unique centre of screen pattern may be placed in the centre of the target screen so that locations all the 640,000 target points can be identified by counting in horizontal and vertical directions away from this of screen pattern. The processing of the images in the calibration process can be carried in-situ or can be uploaded to a central computer for calculation and then downloaded as processed tables in a shorter time.

In the calibration step, the optical device will capture an image of a target point on the target screen. The image of the captured target point will be clustered as a particular group of pixels on the image sensor of the optical device. A computing device will then record the coordinates and light intensities of the pixels as captured by the image sensor of the optical device. Knowledge guided and pixelated interpretation methods are then employed to represent the target points by the row and column numbers of the geometric centre of the shape augmented with fractions based on the intensity and contribution in the 2 dimensions. In embodiments of the invention, such coordinate plus fractional adjustments are identified as the (s, t) reading of a target point, which comprise decimal numbers ranging between negative 5000.00 and 5000.00.

A database device then enters the recorded (s, t) readings into a look-up table stored within the database device. As these (s, t) readings are entered into the look-up table, addresses of such readings in the memory device are associated with their respective (x, y, z) integer coordinates. The target screen's has three axes, whereby each axis has their origin at the location of the optical device, with the x-axis being perpendicular to both the optical device's shooting direction and the vertical direction, the y-axis being the optical device shooting direction, and the z-axis being in the vertical direction. In embodiments of the invention, these coordinates may be in increments of 2 centimetres. While these are integer numbers, it shall be elaborated in later section as to how the locations will be spatially interpreted into decimal numbers, ranging between −5000.00 and 5000.00 in embodiments of the invention. Note that the calibration table entries indexes are in integers.

The steps above are then repeated for all the target points provided on the screen. Once all the target points have had their respective (s, t) coordinates associated with the screen's three-dimensional coordinates (x, y, z) and added to the look-up table in the database device, the optical device is then moved to another calibration position which is slightly closer to the screen. In embodiments of the invention, the optical device is moved closer to the target screen by 2 centimetres. The processes are repeated at several precision 2-D angles to cover wider angles. By the end of this calibration step, the look-up table in the database device would have been populated with the various (s, t) readings along with their associated (x, y, z) coordinates.

An important factor is that these readings are reproducible. This means when we put a target point at a location with coordinates of (x, y, z) relative to the optical device coordinate (0, 0, 0) at another time, the optical device readings will always be the same pair of numbers as those stored in the calibration table. To support such factor, we shall from time to time adjust the calibration or proceed with overall recalibration. While certain factors may be done by recalibration, we shall detail "calibration on the fly" in a later paragraph.

Conversely, if a target point is placed at a location where the optical device reads (s, t), the calibration table can then be traversed to find a set of neighbouring locations in the calibration table such that the readings are near to (s, t) readings. Spatial interpretation may then be used to find the location having coordinates (x, y, z), now in decimal numbers, that closely matches the (s, t) readings. It is then possible that the obtained (x, y, z) coordinates are the actual x, y, z coordinate values of a physical point from the origin of the optical device.

Onsite Calibration and On-the-Fly Calibration

As one might note, the precision of the machine vision system depends on the repeatability of physical readings (the sub-pixel locations) obtained from the optical device. To maintain such repeatability, in addition to a manufacturer's calibrations that may be performed in the factory, onsite calibration is needed. Two of the major factors affecting repeatability are temperature and humidity. In embodiments of the invention, periodic on site calibration may be performed. This would involve placing a single target element in front (e.g. 1.5 meter) of the optical device. The calibration is performed by normalization using software. There are also adjustments on the fly, done automatically based on factory calibrated parameters. Examples are environmental parameters, for example, temperature and humidity which would cause normalizations on the fly.

It should be noted that the thermal expansion coefficient factor causes dimension variations between 60 and 300 micron per meter depending on the type of material that is used. For sensors that have a width of 30 mm, thermal expansion causes an expansion between 2 and 10 microns. This means that for a device implemented with 5 k sensors, this shift accounts for between 0.4 and 1.8 pixels over said temperature range. As optical devices in this disclosure employs subpixel resolution, with each optical device's readings of (s, t) being in decimal numbers, temperature calibration on the fly is necessary.

The implementation of such on the fly calibration is doable-based on the table lookup method:

The optical device is initially calibrated using the same process, and this calibration is repeated at 10 degrees C., 25 degrees C. and 40 degrees C., respectively. The calibration tables are then interpolated or extrapolated in between the 3 ranges in the calibration table for each (x, y, z) entry using the gradients of thermal expansion as computed below.

For example, a calibration reading for CT (x, y, z) is first obtained, which is (s1, t1) at 25° C., (s2, t2) at 40° C., (s3, t3) at 10° C.

For temperature T between 5° C. and 25° C., the CT (x, y, z) at temperature T should be s=s2−(25−T)/15*(s2−s1) t=t2−(25−T)/15*(t2−t1)

For temperature T between 25° C. and 45° C., the CT (x, y, z) at temperature T should be s=s2+(T−25)/15*(s3−s2) t=t2+(25−T)/15*(t3−t2).

The above steps may be applied to all the points in the calibration table (CT) to carry out on the fly calibration of the calibration table for a temperature T.

Machine Braille

Braille code has the fundamental nature that flat and dot_information is presented in a 2 dimensional plane. A machine Braille code format is proposed as shown in FIG. 3(A). This format was proposed based on the criteria of maximum signal to noise ratio under unpredictable distortion, reduced pixel resolution and varying lightings. The proposed machine Braille code format employs binary coding and two-dimensional relative positioning. Machine signage 120 comprises a header 122 followed by information 124. Each machine Braille "dot' 126 is represented by a mirrored 7' symbol which can be described as an indicia with an upper block and each "flat" 128 is represented by an 'L' symbol which can be described as an indicia with a lower block. Indicia with the upper block are used to define a first state while indicia with the lower block are used to define a second state. Codes extend vertically within a square signage boundary 130. For different environments, there may be a need for a different set of "language" for machine Braille code. The header 122 specifies the language of a signage. When an indicium is read clockwise and is determined to be from thin to thick, this indicium is defined as a "dot" and when an indicium is read counter clockwise and is determined to be from thin to thick, this indicium us defined as a "flat". This property assists in the interpretation of the indicia from any direction.

This code enjoys the best signal to noise ratio under uncertainty of shape distortion, lighting condition, sensor resolution and approaching angle. In short, the proposed machine Braille format is able to achieve high resolution under various conditions.

Figure 3:
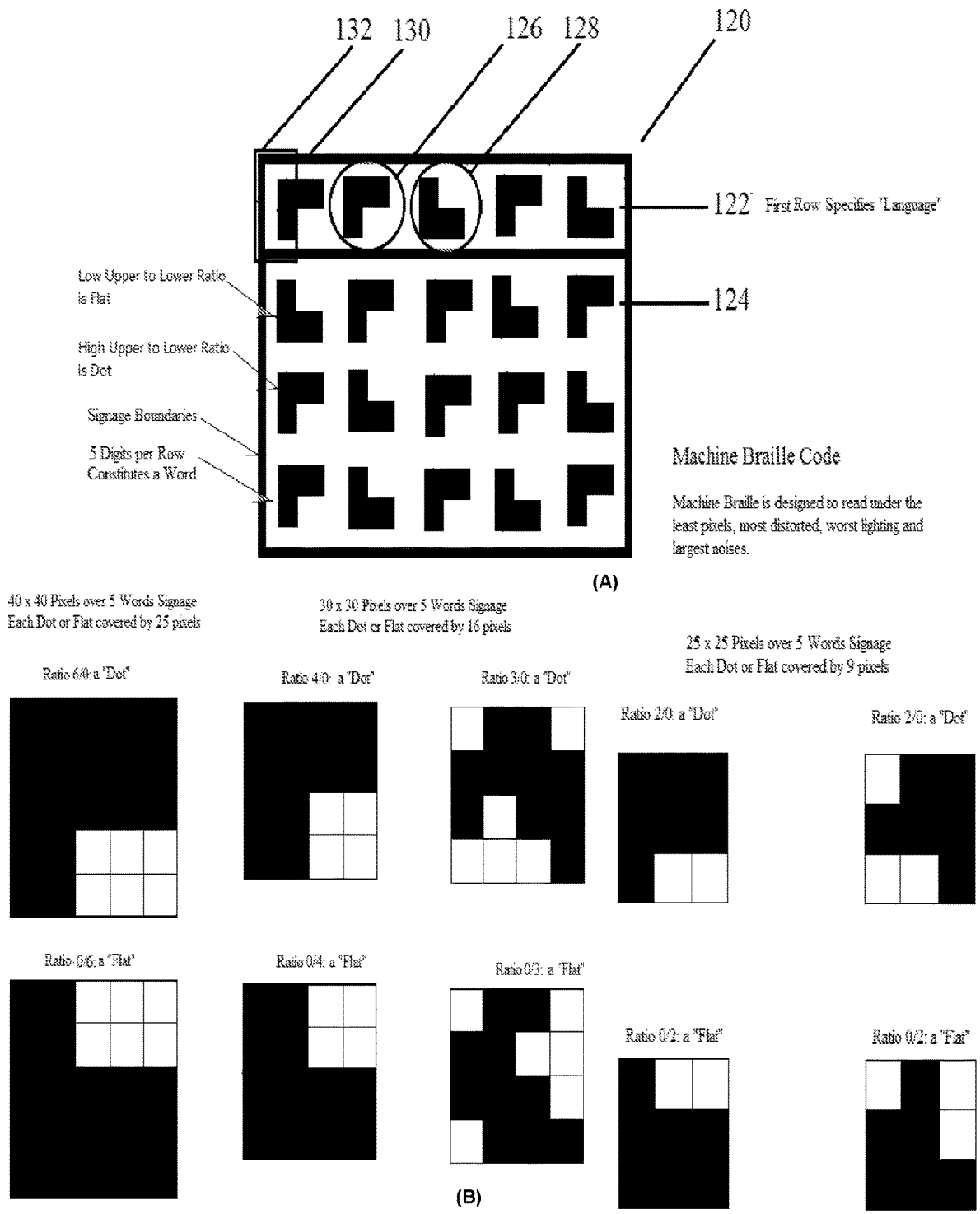
FIG. 3 illustrating a format of a machine Braille code in accordance with embodiments of the invention.

FIG. 3 (B) shows readings obtained at different angles and under variable light conditions based on a 1 or 0 reading at each pixel, when the target element is beyond 6 meters away under the sensor density of the current implementation. The machine Braille is designed with "1" and "0" as a flip or flop status. Bit information is then extracted from relative readings of the flip-flop. Implementation of the bit recognition can be by syntax rules for nearer target elements. The recognition can be a readout table of $2^{16}$=64 K bits of memory for further targets. When machine Braille code is between 5×5 to 8×8, a sampled 4×4 pattern can be used for the 4×4 readout table. One skilled in the art will recognize that FIG. 3 (B) only illustrates representative samples and does not exhaust all possible sensor patterns.

Figure 4:
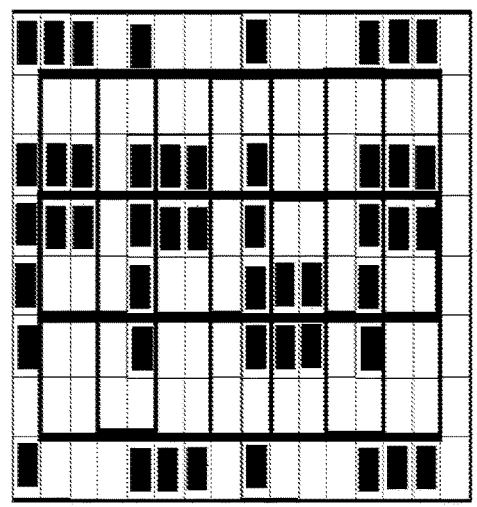
FIG. 4 illustrating an interpretation of the machine Braille code shown in FIG. 3 in accordance with embodiments of the invention.
Figure 4:
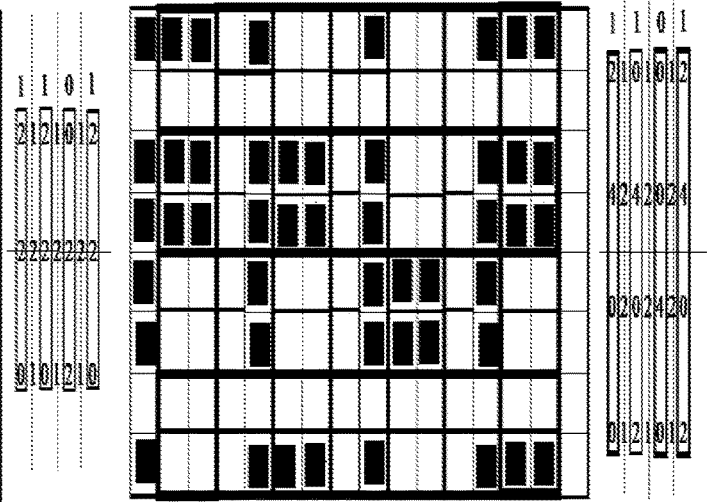
Figure 4:
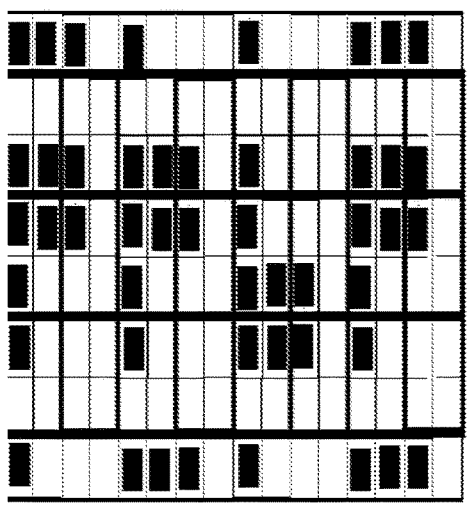
Figure 4:
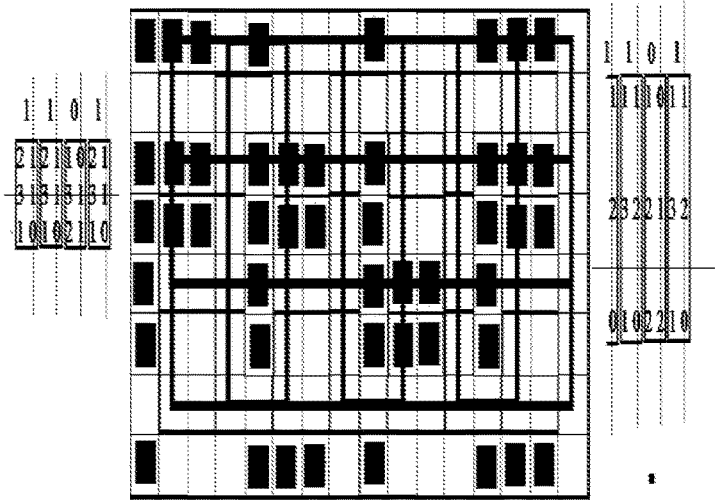

The feature of clockwise thin to thick representing one state and counter clockwise thin to thick representing the other state make it direction resisting. In applications where signage is placed up side up, the machine Braille code bits can be closely positioned. FIG. 4 shows the tightest "page" where the bits are tightly positioned, while there is a gap at the left and the bottom with the same width as that for the bar mentioned above. This tighter pattern requires knowledge on whether the signage is arranged from top up or top down. The header provides such information, as this information is required before the machine Braille code can be decoded correctly. Here, 4 reading levels are analysed at each pixel. Assuming the camera resolution is 5K, the camera angle of view is 120 degrees and the distance is 9 meters. In such a situation, the pixel resolution is 0.38 cm. Assume worst case image reduction is 150%, the resolution is 0.57 cm. The bit information is 3 pixels in width and 3.75 pixels in height. That is it is 2.1 cm wide and 2.5 cm tall, inclusive of a 0.4 cm gap on the left side and a bottom side gap. The bit density would be 0.19 per square cm hence 40 bits of information may be read on a signage of 15 cm square. This is higher density than the 25 machine Braille bits proposed in FIG. 6.

The grids superimposed on each of the squares in FIG. 4 represent the pixels. The underlining pixel positions shows how shifted sensor position in all cases still allows rows and bit sequencing to be recognized and for the 1's and 0's to be decoded. Note that each 1 or 0 state is not represented by being dark or white, but by flip-flop's so as to counter lighting variations and other noises. In FIG. 4(B) the pixels shift up one half pixel distance. In FIG. 4(C) the pixels shift left half pixel distance. In FIG. 4(D) pixels shift up a quarter pixel distance and shift right a quarter distance. These shifts represent the worst case shifting. Pixel responses are recorded for all 4 levels, with the obtained patterns shown in a table adjacent each of the figures. It can be noted that the reading method works under any shifting between the image and the sensors in all 4 directions.

It should be noted that the machine vision system is employed not only for analysing the environment, but also to read coded instructions and information, including data to derive the physical area or location of the machine vision device itself.

Target Element

Figure 6:
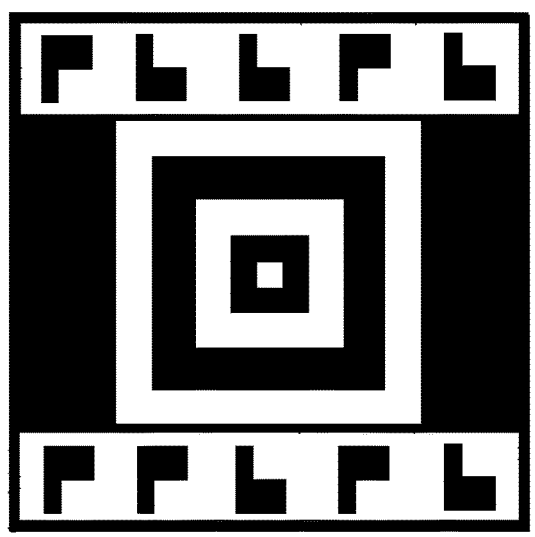
FIG. 6 illustrating target elements in accordance with embodiments of the invention.
Figure 6:
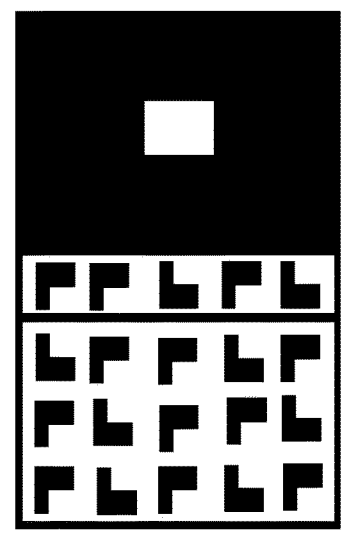

A target element is designed with a marker pattern having symmetric geometrical features and a unique colour and a signage pattern having codes contained therein as shown in FIG. 6. The symmetric geometrical feature in the marker pattern defines the centre of the target point. Unique colours and patterns are employed so that the marker pattern can be easily filtered during the detection step. The signage pattern in each target element contains codes that may be read by machine vision systems. In short, the target elements may be regarded as a unique sign comprising machine codes with pertinent target information and a marker pattern of symmetric geometric figure having a target centre. The machine codes in the signage pattern also provide a means to verify the authenticity of the captured image as a target point, as opposed to noise or unrelated patterns.

Figure 5:
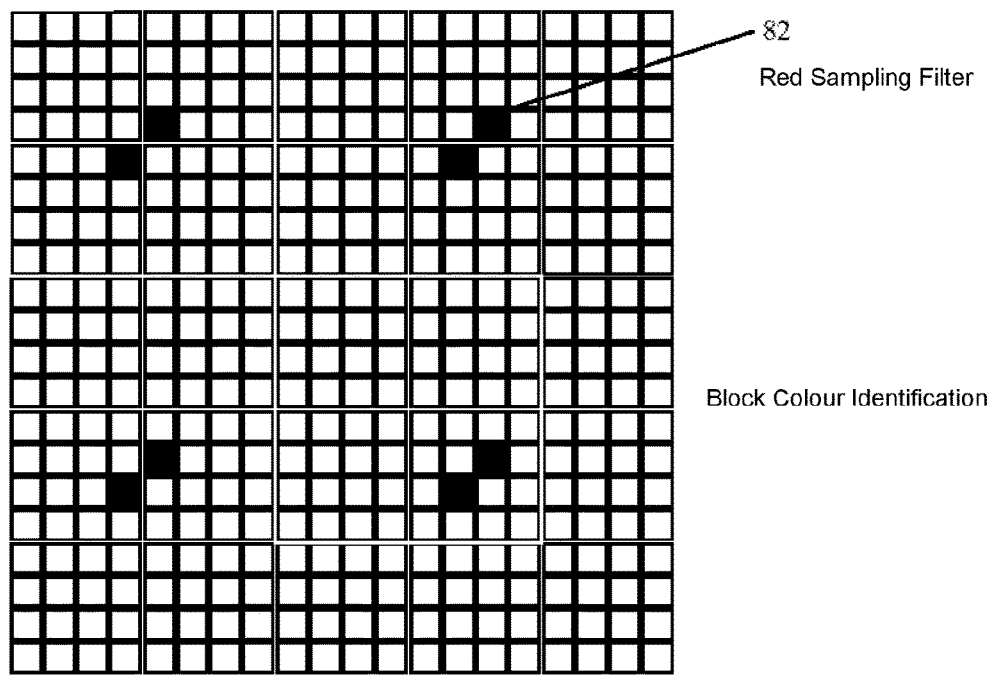
FIG. 5 illustrating a mono-colour sampling filter in accordance with embodiments of the invention.

The first task for the target element based machine vision is element detection. First, a mono-colour sampling filter is utilized in an embodiment of the invention and such a filter is illustrated in FIG. 5. This filter is employed to detect patterns having certain colours and does so by filtering out windows having a specific unique colour or pattern. In operation, one or a set of single colour filters 82 are repeated at desired sampling locations on top of the image sensor. For a captured image having the selected colour, the sampling filter will not affect image's resolution. For a captured image having other colours, the sampling filter will block the other colours. Hence, the filter does not sacrifice any resolution on the pattern in the representing colour.

For example, a single colour such as red may be used in the target element. However, one skilled in the art will recognize that other colours may be used without departing from this invention provided that a corresponding colour filter is utilized. A pair of red filters is then applied to every 10×10 sponsored block. The use of the pair of red filters increases the signal noise ratio, and also in the situation where one of the filtered sensors is not working properly, the other filter sensor will still detect the required colour thereby representing both filter sensors. Such a sampling setup reduces the scanning time of a 20 mega pixel sensor to less than 0.1 milliseconds.

Figure 7:
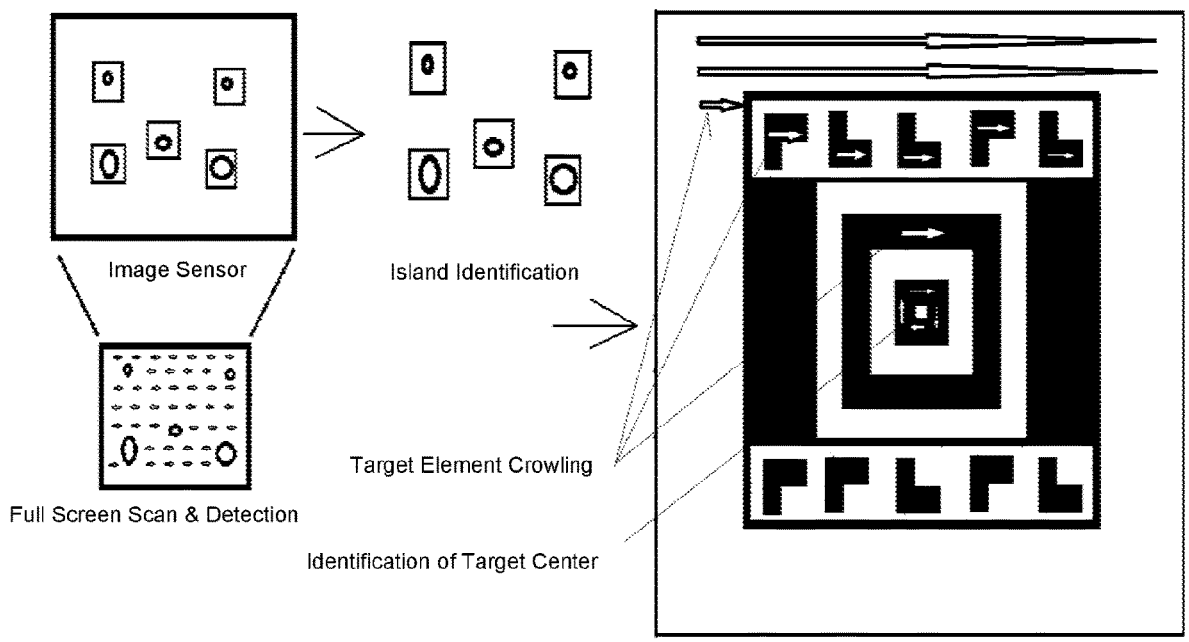
FIG. 7 illustrating knowledge guided recognition of target elements in accordance with embodiments of the invention.

Areas on the target element then need to be verified using the machine Braille code. Further information in machine Braille code may be set out at the bottom of the target element to provide additional information. A tracing algorithm can be employed to verify and read the machine Braille code efficiently via combined detections of syntax and geometry Each target pattern may also comprise a combination of geometric and syntactic patterns, whereby knowledge guided recognition may be applied to detect and verify the existence and a centre of the target element. This is shown in FIG. 7. Using typical recognition algorithms, a crawler configured for both crawling distance and topological relations is employed. Upon identifying the target element, the crawler performs random access based on distance and knowledge guidance. The time taken for identification of the target element centre is greatly reduced due to the knowledge guidance. Due to the possibility of having varying imaging sizes, there can be 2 modes of patterns in the target element as shown in FIG. 6 (A)—a first mode comprising a large outer pattern for a small image and a second mode comprising small inner patterns for a larger image. Maximum 100,000 arithmetic operations are estimated to be required to complete the tasks of locating all the target element centres. Hence, a 3 GHz processor can be configured to complete the computations of the algorithm in 0.5 milliseconds. All remaining positioning algorithms can be carried out in another 1 millisecond.

The target elements described earlier were shown as examples in FIG. 6. The 2-dimensional target element can be, for example, a 15 cm square as shown in FIG. 6 (A). Each target element contains a unique header (signage pattern) and a marker pattern for identification and vector information leading to the centre of the target elements (centre of the marker pattern). The pattern on the target element and its centre shape may comprise a geometrically symmetric pattern whereby the centre of symmetry of the pattern is easily identified to be the geometric centre of the marker pattern. As mentioned above, the contents on each target element can be a special type of signage coded in machine Braille. FIG. 6 (B) illustrates the example that more information is incorporated in a target element via a menu in machine. FIG. 6 (B) also illustrates a target element with simpler centre specifying pattern.

Optical Device Implementation

In embodiments of the invention, the present invention uses optical devices such as cameras having 20 million sensors, a mature camera technology. Camera manufacturers currently produce cameras having sensors of around 50 to 120 million pixels. Lenses with 180 degrees angle of view are also readily available. The analysis on resolution is based on 120 degrees angle field of view. Due to the effects of distance and the intrinsic nature of wide angle lenses in general, in a theoretical worst case scenario, we assume images distort 150% at the periphery of the viewing area. When the distance of a target element is 9 m away from the optical device, a 15 cm by 15 cm target element covers 1,600 pixels. Due to the effects of non-linearity at worst case, are represented by 625 pixels. This is acceptable as a centre of the target element can be precisely calculated to sub-mm distances based on the centre block of the target element and Machine Braille at least 5 words can be read from 25×25 pixels.

Camera download time had been designed with the criteria of industry standard frame time 16 to 35 milliseconds. The electronics, including both image processing hardware and digital computation, have aggressively advanced passed such frame time limits and the CMOS to RAM mapping time is shortening every quarter. Hence, frame time of around 3 milliseconds is a practical goal. There is not much need for 330 frames per second for human day to day use. However, for machine vision, the sky is the limit for automated vision applications. This shall create incentives for advancement of even much faster electronics. With a linear speed limit of 3.3 meters per second in a scene with 3 milliseconds frame time, positioning difference due to sampling latency is reduced to 1 centimetre.

Focus Ratio Adjustment and Focusing Time

While narrow aperture is used for wider range of clear image, focusing may only be needed when the vision system is used in short range mode, for example when the target element is 1 meter or less away from the optical device. The (s, t) (u, v) readings then have to be adjusted with an appropriate focus ratio to normalize the scaling due to focusing issues.

The x and y axis pixel location of a target element centre of the images needs to be first normalized by multiplying the focus ratio with the x and y axis pixel coordinates. This is true for both calibration and positioning. The focus ratio is defined as a focal length of the initial state focal length with zero adjustment divided by a focal length of the object image. Frame time positioning is no longer available when focusing is needed as its response time would be about 60 milliseconds. Positioning frequency shall be reduced to 15 times per second. Sensor technology progresses on a quarterly basis, such that for practical implementation of the general monocular vision, the focus ratio adjustment and time delay is all together avoided as long as the target elements are positioned at least 60 cm away from the optical device. An increase in the size of the target element negates the need precision focusing.

Target Element Based Machine Vision

In summary, the machine vision system is able to satisfy both of the following properties a) Repeatability: Integrated readings of the row and column pixel sensors, and interpreted fraction thereof, represented as (s, t), based on a point in the 3 dimensional space represented by (x, y, z) in front of the device within a range of interest is repeatable in that such values will remain the same.

b) Monotonicity: Said (s, t) readings shall be monotonically increasing in their values as long as the point moves to a new location (x', y' z') with x'>=x, y'>=y and z'>=z relative to the optical device.

The target elements employed in the machine vision system each comprises a 2-dimensional shape such that the geometric centres of such shapes (target points) can be found. Each target element also contains codes pertaining to their purposes and location.

In embodiments of the invention, the (s, t) readings of an optical device are first calibrated as a function of all the locations of the range of interest for every 8 cubic centimetre within the field of view with 120° angle of view, e.g. approximately 230 million locations. This is done as previously described. Depending on cost specifications for different applications, by reducing the calibration density to (4 cm)$^3$, the number of locations in a table can be reduced to 28 million, thereby reducing the overall cost of the system at progressively less costs.

In embodiments of this invention, monocular stereo machine vision may be implemented without relying on movements. One should recognize that monocular stereo vision does not necessarily require only one optical device, but implies that a set of optical devices that may work alone or/and jointly to perceive and position within their ranges of interests.

General Monocular Based Machine Vision with Four Target Elements

When an optical device is integrated into a machine movable with 6 degrees of freedom, the optical device will move with three-dimensional angular freedom. In other words, as the z-axis of the optical device is an unknown parameter or as a reference to a ground level is not available, the generalized monocular vision method described herein is required to identify the location of the optical device with respect to four target elements. Such an optical device may be employed indoors or outdoors such as, but are not limited to, factory settings, warehouses, auditoriums, and other similar types of environments provided that there is sufficient space for the four target elements to be conveniently affixed.

Figure 8:
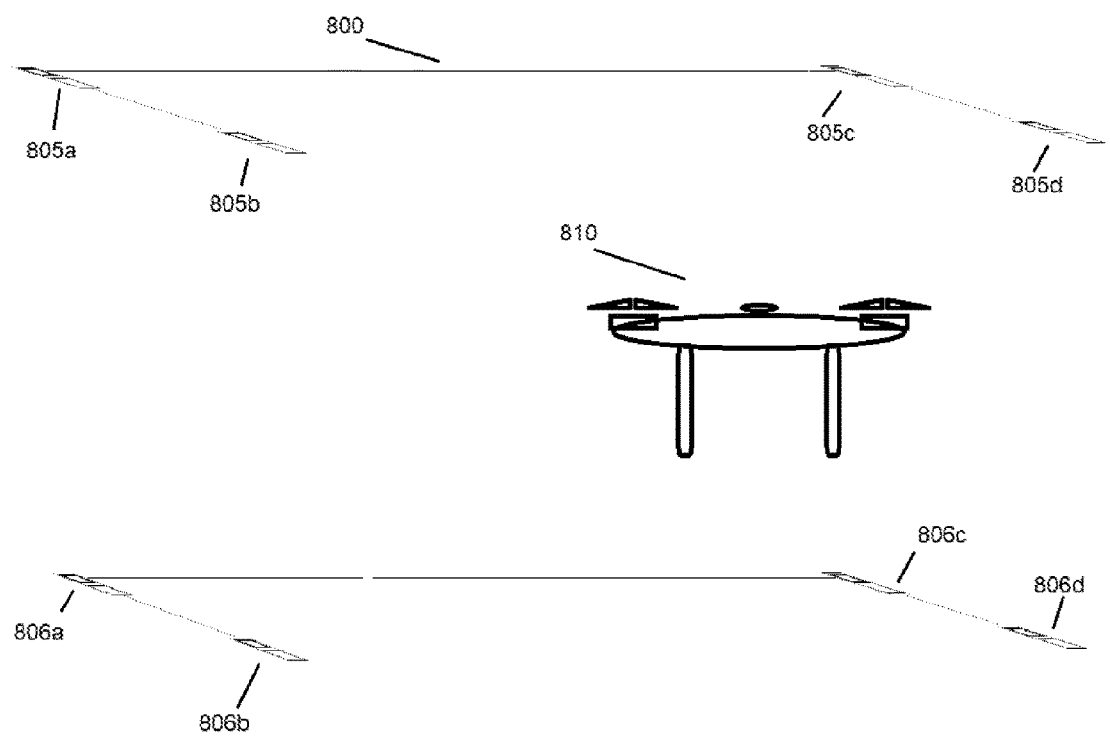
FIG. 8 illustrating an embodiment whereby four target elements are affixed to a ceiling and another four target elements are affixed to the ground in accordance with embodiments of the invention.

FIG. 8 illustrates an exemplary embodiment of such a setup 800 whereby four target elements 805a, 805b, 805c and 805d have been affixed on the ceiling. This figure also illustrates four target elements 806a, 806b, 806c and 806d that have been laid on the ground as an alternative or as an augment to the ceiling targets. By having target elements on the floor and on the ceiling, this reduces the risk that items in the aisle may incidentally block the target elements from the light of sight of drone 810. It should be noted that drone 810 includes at least one optical device that has been configured in accordance with embodiments of this invention and the optical device has been calibrated separately in accordance with the steps mentioned under the section "Onsite Calibration and On-the-fly Calibration". Further, in this example, it is noted that the optical device is provided at the front of the drone such that the optical device is configured to capture images above the drone as well as configured to capture images below the drone.

Path of Sight

With reference to the description and execution of the calibration table in accordance with embodiments of the invention, the concept of Path-of-Sight in the implementation of the general machine vision method is defined herein. In general, a path-of-sight comprises a line that is typically formed between a target element and an optical device. To recap, when the optical device captures an image of the target element, the optical device generates a corresponding (s, t) value. Contained within the calibration table would be a multitude of (s, t) values and their corresponding (x, y, z) values. This means each (s, t) pair in the calibration table would have its own associated (x, y, z) values. These (x, y, z) values may then be used to plot a series of points between the optical device and the target element. This line that is made up of the series of points is then defined as the path-of-sight of (s, t).

A path of sight associated with a calibration table is defined by a series of (x, y, z) locations associated with a pair of non-integer or integer numbers that are derived from the optical device, which specifies an interpreted 2 dimensional location of the optical sensor based on a form of pixelated interpretation. Stating alternatively, when the specification of a calibration table is based on every 8 cubic centimetres, for each 2 centimetres of y in integer, there is a pair of x and z with decimal values such that the spatially interpreted calibration table would derive at the same (s, t). Then, for each pair of (s, t) with decimal values derived from the optical sensor and for each y axis (in the lens shooting direction) with decimal value, there is a pair of linearly interpolated x and z with decimal values such that the spatially interpreted calibration table would derive at the same (s, t). Hence, it can be said that a path of sight is a path originating from the optical device that is made up of line segments having the same (s, t) value and whereby extends along the y-axis direction passing through y locations within the field of view of the optical device.

As illustrated in FIG. 8, each group of target elements comprises at least four target elements. In this example, the path-of-sight describes the path from drone 810 to anyone of target elements 805a-d or 806a-d. As drone 810 moves and captures images of the target elements, the sensor of the optical device on drone 810 generates (s, t) values for each of the target elements and these (s, t) values are utilized with the pre-generated calibration table to generate the respective path-of-sights which is then in turn used to obtain the locations of the target elements.

Hence, when two target points are captured by the optical device, 2 paths of sight will be generated, i.e. two series of points whereby each path has its own (s, t) value. In such a situation, if a distance D between the 2 target elements is provided as part of the constraining rules, any line segment (here in referred to as pier) connecting the 2 paths of sight with length D may then potentially be used together with the calibration table to obtain the solution of the positioning of the 2 target points.

In more specific terms, piers are used to link 2 paths of sight together. Once a pier length is specified, there can be multiple pairs of piers linking the paths of sight together, from at any starting point on a first path of sight to a termination point on a second path of sight. Each pair of piers are flip positions of the line segments with the same distance as that for 2 target elements of interest. It should be noted that when a start point is selected from one of the paths, piers may not exist between two paths of sight when the specified pier length is too long or too short.

Paths of sight plotted in the figures herein with a side view can only be conceptually envisioned. By definition of the paths of sight, the optical device can only derive four points that represent the 4 target elements in any snapshot and all the piers are seen by the optical device as one line segment connecting two points. The spatial positioning solutions of the 4 target points are all computed from the 8 non-integer values derived from the optical device.

Uniqueness of Solutions of Positions of Target Elements

For each point on a path of sight, there can be a forward stretching and a backward stretching pair of the same pier height to another path of sight. This creates potential for multiple solutions. The multiple dual choices are eliminated by relative constraints associated with the 4 target points. Optical device angular references can be established among the 4 target points using the calibration table. There is one rule associated with the intrinsic of the optical device, that the paths of sight are monotonic relative to the centre axis.

Figure 9:
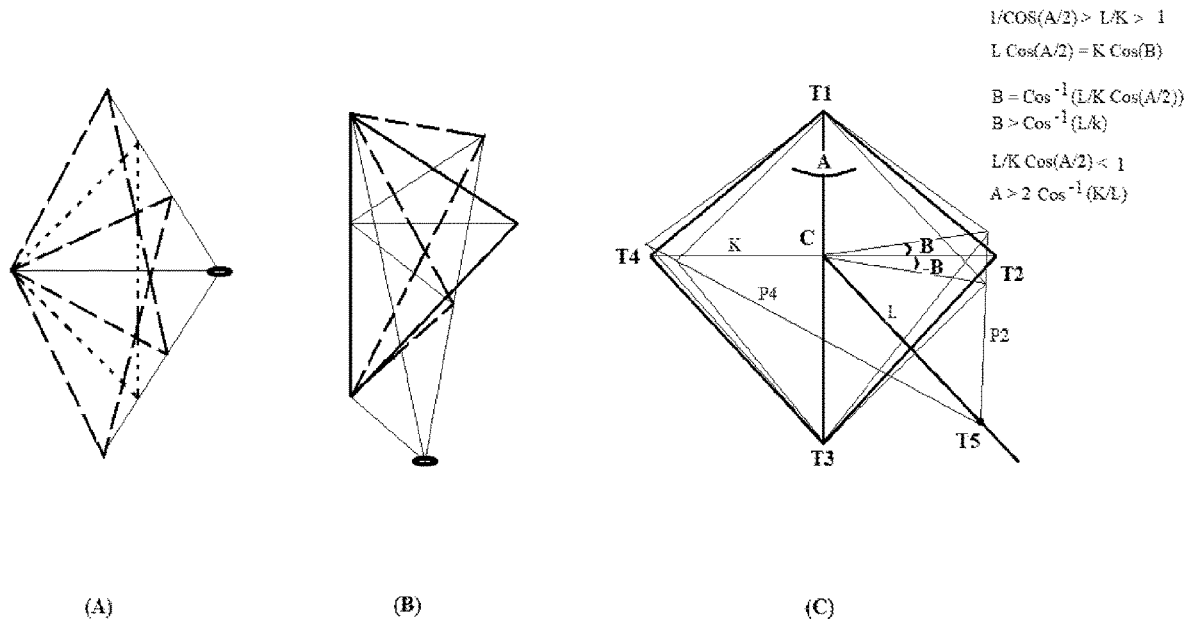
FIG. 9 illustrating a flip sight analysis methodology.

It is useful to note that if only three target elements are utilized, the system may not always produce a unique solution of the positions of the target elements relative to the optical device. For example, as shown in FIG. 9 (A), the target elements form an equilateral triangle. In an equilateral triangle, one may always find a flip side solution. This is true regardless whether the optical device and the triangle are coplanar. Another example is shown in FIG. 9 (B) where one target element has a projection point to the line connecting to the other 2 targets coinciding with the projection from the optical device to the line; there are always flip side solutions. One can refer to FIG. 18 to see that for a starting point in one path of sight, up to 4 triangles may be plotted, T1-T2-T4, T1-T2-T4', T1-T2'-T4 and T1-T2'-T4', derived by their respective flip positions. There is a chance that more than one among T2-T4, T2-T4', T2'-T4 and T2'-T4' with distance equalling the distance between target point 2 and target point 4, when the starting point moves outward or inward.

However, when 4 target elements are utilized, unique solutions for the positions of the target elements relative to the optical device can be found provided that the lens intrinsic are linear and no three target elements are arrange in a co-linear manner. One skilled in the art will recognize that it is not a requirement for all four target elements to be coplanar.

There is one type of shape, here in named Kaden's Kite, as shown in FIG. 9 (C), which is able to generate 2 solutions. General specification is that two points are on a rotation axis and 2 other points on a plane perpendicular to the rotation axis. Kaden's Kite is non-planar, composing of 2 identical triangles which join together at an angle A. Note that T1 and T3 being on the same side of the T2 T4 line is also acceptable. When lens is at the centre of the angle A, along the same height as the 2 triangle tips, T2 and T4 within a limited range, there are always 2 solutions, one at an inward angle B and the other at an outward angle −B. The angle B varies depending on the distance from the line of the joining triangle. Let the distance between the centre point C and the triangle tip T2 be K and the distance between the centre C and lens T5 be L. When the lines of sight P2 and P4 are perpendicular to the 2 triangles, respectively, as the axis is rotated in either directions for an angle B as in FIG. 9 (C), T2 and T4 touch the lines of sight at the same angle B, at the same time. Hence lens at T5 would not be able to tell whether Kaden's Kite had turned clockwise or counter-clockwise. Kaden's Kite as described herein is the only shape that can produce 2 states having the same sensor read outs for the 4 target points under the above described general conditions for 4 target points. The range of L is bounded by $L > k$ and $L \cos(A/2) < K$. T5, that is the lens location, cannot observe the difference of the 2 states only in such distance range. Another relation is $L \cos(A/2) = K \cos(B)$. These can derive to the ranges of angle A and B to be: $A > 2 \cos{-}(K/L)$; $B > \cos{-}(L/K)$.

This exercise which demonstrates the uniqueness of solution when lens' intrinsic are linear, also demonstrates the delicate differences which is employed to prevent extra solutions. The 4 targets are labelled so there is unique designation of which of the 8 octants the optical device is in. In the case that 4 target points are relatively far from the optical device and the target group engagement angle is close to be perpendicular, one may find more solutions. This is termed origin crowding. Once the distance to the target group is closer such that bending of paths of sight can no longer be that severe, the extra solutions would disappear. Except for Kaden's kite, there is always a unique solution when the paths of sight are straight lines. In the case that the paths of sight are monotonic but nonlinear, It is observed here that there is "almost" always a unique solution, given that the targets are not cluster in the centre of the field of view.

Figure 11:
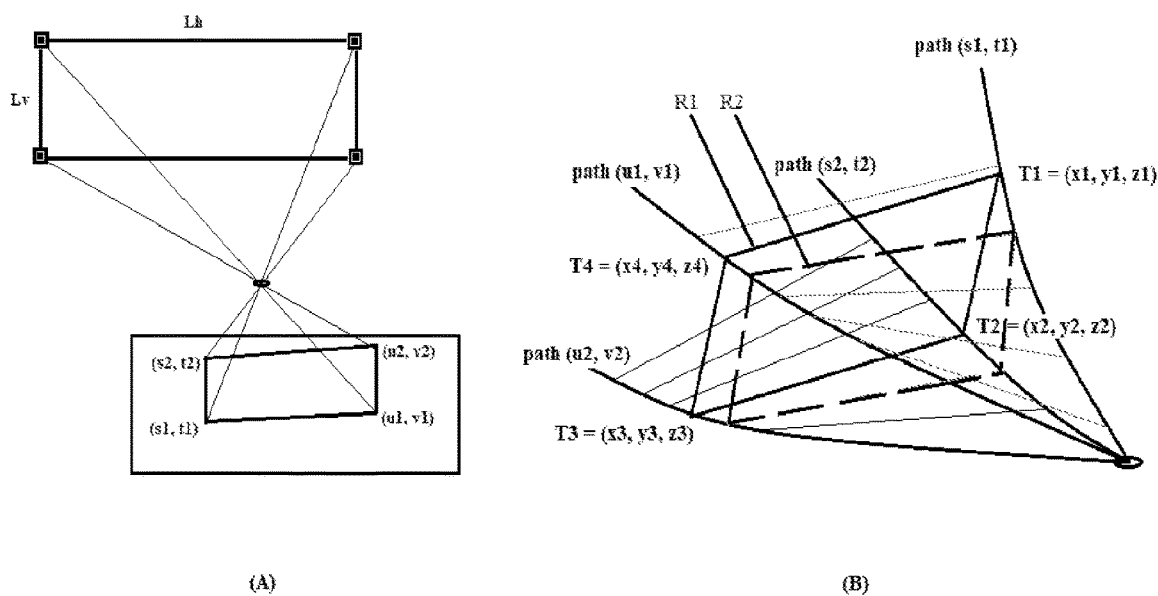
FIG. 11 illustrating an exemplary method for applying a rectangular monocular vision to acquire locations of the four target elements in accordance with embodiments of the invention.

The "almost" is asserted herein as in principle, a lens could be molded to have paths of sight specifically tweaked. That is, a lens deliberately made with predefined intrinsic that create a specific set of paths of sight. FIG. 11 (A) shows how an optical device may be utilized to read the 4 target elements at a given position. In FIG. 11 (B), the 2 rectangles may be regarded as rigid plates that are placed in 2 orientations and positions, one represented by solid rectangle R1 and a further inward position represented by dotted rectangle R2. Note that R2 is further rotated along the A and B angle in Euler angular notation. The lengths and shape of the rectangles are identical as they are merely 2 positions of a rigid body. When a lens is deliberately designed with intrinsics that represent 4 specific paths of sight, it would be possible for R1 and R2 to both have their 4 corners touching the 4 paths of sight. This means there would be more than 1 position as solution. It is noted here, however, one may use up a country's whole resources to mold such lens, and fail.

The "almost" is asserted here because in natural world, such a match is impossible. Here is the analysis and explanation. A tolerance limit is set at 3 degrees angle surprise, as a 3° error, based on Sine(3°), shall cause position deviation of 5%, or 22 centimetres if the distance between targets and optical device is 5 meters apart. 90 degrees angle of engagement toward the target plane, is the worst angular to create different reading on the sensor, based on Sine(Angle of Engagement). Assume angle of engagement toward the target plane is less than 86 degrees. 3 degrees of angular deviation creates difference of 0.966–0.951=1.5%. When the positions is refracted onto the optical sensor as in FIG. 11 (A), their outputs are about 37 pixels apart. Matching of both R1 and R2 means the solid body is placed inward, say for about 10 centimetres toward the optical device and the 4 paths of sight are bent in 2 dimensions to fit and match on to the 4 corners of the same solid body. Monotonicity feature is always maintained. However, the trend of the paths of sight maybe, say between 20 pixels to 60 pixels, with an average of 40 pixels, around a particular corner of the shape at the second position. Assume that resolution is one pixel, there is 1 over 400 chance that the calculation finds the second match on one path. Upon fitting one point to one path of sight, the chance of matching the remaining 3 paths of sight is $(2^{-9})^3=2^{-27}$. Such is the chance is when 2 positions deviate by exactly 37 pixels. Total probability is obtained by integrating over 38 pixels, 39 pixels and so on and such integrated chance is about $2^{-24}$. However, when resolution is improved beyond pixels via pixelated interpretation, the chance reduced to $2^{12}$ and the chance for all 3 matchings becomes $2^{-33}$.

To appreciate in another way, possibility of a target shape with wild position differences having the same output as a fabricated set of output readings is analysed herein. If one fabricates 4 output readings by arbitrarily assigning 8 numbers within the sensor range and ask the 3 D locations of the 4 points, the answer is—no there is no such outputs for the shape in whatever 3D locations and 3D rotations in the field of view. The reason is as follows. There can be about 100 million cubic centimetres=$2^{30}$ cubic centimetre ways to put target T1 in the field of view. There are 360 degrees=$2^{10}$ half degrees rotation in A B and G Euler angles, total $2^{30}$ half degree rotations. So there can be $2^{60}$ ways of projecting the target group (onto the sensor) from within the field of view of an optical device. The sensor has 20 million=$2^{24}$ pixels which means there can be $(2^{24})$ 4=$2^{96}$ fabricated outputs for 4 target points. Hence the fabricated outputs have a chance of $2^{-36}$ to represent a real set of readouts, which is one order of magnitudes less chance of the above case.

Such analysis also points out that a target group of 3 target points not only creates bothering dual solutions under many conditions, but also increases the odd of multiple solution due to lens intrinsiacs by $2^{12}$ times. Hence, ideally, groups of 4 target points are employed.

Hence we proclaim that a set of 4 coplanar target points without any 3 being colinear is good and sufficient for positioning. Unique positioning shall be derived even if the optical device is coplanar to the target points.

The General Monocular Machine Vision Method

With reference to FIG. 10*a* and given that four target elements 1001*a*, 1001*b*, 1001*c* and 1001*d* are captured by an optical device provided at position 1050, the method of obtaining the location of the optical device in relation to target elements 1001*a-d* can be defined by the following general process.

Target elements 1001*a-d* are first captured by the sensor of the optical device and the sensor then generates the respective sensor output (s, t) decimal values for each of the target elements, i.e. 1001*a*—(s1, t1), 1001*b*—(s2, t2), 1001*c*—(s3, t3) and 1001*d*—(s4, t4). In embodiments of the invention, it may be assumed that the four target elements 1001*a-d* form the four vertices or corners of a quadrilateral.

Values of (x1, y1, z1), (x2, y2, z2), (x3, y3, z3) and (x4, y4, z4) are then found from the calibration table (CT) with the following readings: CT(x1, y1, z1)=(s1, t1), CT(x2, y2, z2)=(s2, t2), CT(x3, y3, z3)=(s3, t3), CT(x4, y4, z4)=(s4, t4), and also, such that the following conditions are satisfied:

$$\text{Length}((x1,y1,z1),(x2,y2,z2))=L12,$$

$$\text{Length}((x1,y1,z1)(x3,y3,z3))=L13,$$

$$\text{Length}((x1,y1,z1),(x4,y4,z4))=L14,$$

$$\text{Length}((x2,y2,z2),(x3,y3,z3))=L23,$$

$$\text{Length}((x2,y2,z2)(x4,y4,z4))=L24,$$

$$\text{Length}((x3,y3,z3),(x4,y4,z41)=L34.$$

The length of L12, L13, L14, L23, L24 and L34 may be derived from data read from each of the target elements themselves. In an embodiment of the invention, the constraining rules listed above may be used to obtain the appropriate readings from the calibration table. The searches are hierarchical in nature and require higher computational complexity. Tremendous numbers of (x, y, z) locations need to be tested that may read CT(x1, y1, z1)=(s1, t1), CT(x2, y2, z2)=(s2, t2), CT(x3, y3, z3)=(s3, t3), CT(x4, y4, z4)=(s4, t4) from the calibration table. Hence proper and intelligent search methodologies need to be employed.

With smart schemes that trade off time complexity with memory capacity and with interpolated searches being carried out based on indicative parameters as demonstrated below, only few milliseconds are needed.

The method can be applied to any quadrilateral shape with 4-corners (i.e. 4 target elements as the corners). These 4 target elements do not necessarily need to be coplanar, but none of at least 3 target elements are co-linear.

With reference to FIG. 10(B), in an embodiment of the invention, a search methodology of obtaining the location of the optical device in relation to target elements 1001a-d can be itemized as follows:

1) Four paths of sight each corresponding to each of the 4 target elements, T1-T4 respectively, are first plotted using the corresponding (x, y, z) values from the calibration table of the optical device. This is illustrated in FIG. 10(B)
2) Starting at a point 1010 on path of sight (s1, t1) which is at least 60 centimetres away from the lens (minimum vision range), two piers having a length of L14 are plotted from path of sight (s1, t1) onto path of sight (s4, t4) whereby the length of each pier is equal to the distance of line segment T1-T4 or the shortest straight line distance between T1 and T4.
3) Then from the up to 2 points on the path of sight (s4, t4), up to 4 piers are plotted from path of sight (s4, t4) onto path of sight (s3, t3) whereby each pier has a length of L43, where L43 represents the distance of the line segment T4-T3.
4) From the same point 1010 on (s1, t1); up to 2 piers are then plotted from path of sight (s1, t1) onto path of sight (s2, t2) whereby each pier has a length of L12, where L12 represents the distance of line segment T1-T2.
5) Then from the up to 2 points on path of sight (s2, t2), up to 4 piers are plotted from path of sight (s2, t2) onto path of sight (s3, t3) whereby each pier has a length of L23, where L23 represents the distance of line segment T2-T3. FIG. 10(B) only illustrates two L23 piers as the other two piers are too long and as such, will not be plotted.
6) Points on path of sight (s3, t3) that are derived from piers originating from path of sight (s2, t2) are then matched with points on path of sight (s3, t3) that are derived from path of sight (s4, t4). An example is the point 1020.
7) If the length between the starting point 1010 on (s1, t1) and the end point 1020 on (s3, t3) equals L13 (the distance of line segment T1-T3, see FIG. 10(A)), and the length between the corresponding point 1015 on path of sight (s2, t2) and the corresponding point 1025 on path of sight (s4, t4) equals L24 (the distance of line segment T2-T4), then the answer is found.
8) Otherwise, the steps above are repeated by moving the starting point 1010 on (s1, t1) 2 centimetres away from the lens, or until the distance from point 1010 to (s2, t2) or to (s4, t4) become greater than L12 or L14, respectively.

Each 3D shape represented by 4 points has a flip counterpart that has the same 6 distances between each pair of points. The above method does admit the flip shape of the 4 targets group to be tested. However, by the same token as analysed in the previous paragraph, the flip shape would not pass the matching test.

Figure 10:
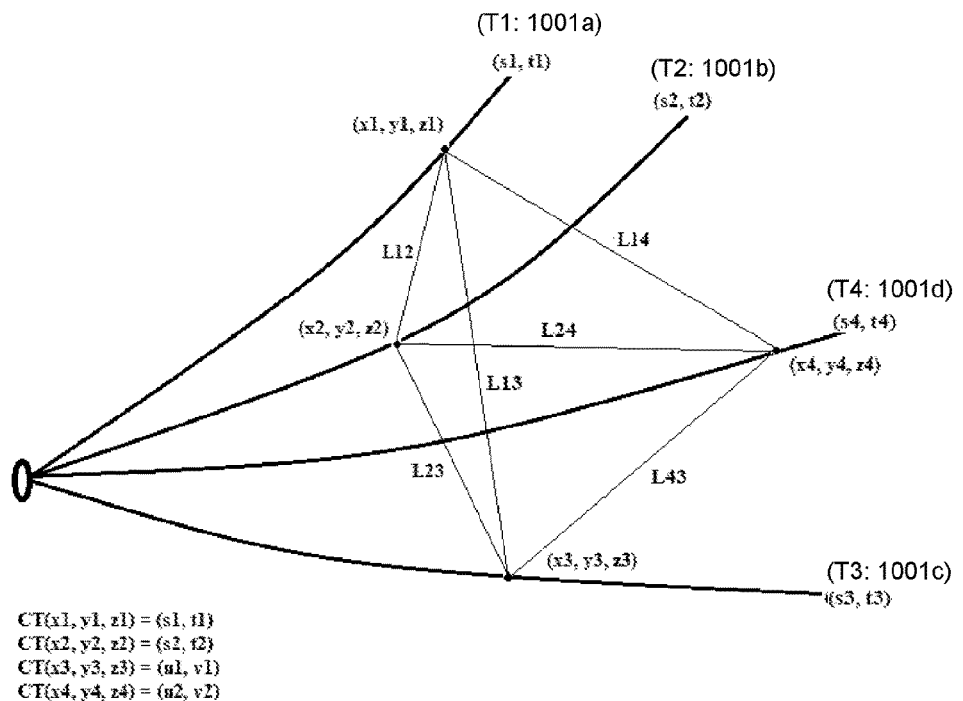
FIG. 10 illustrating a general monocular machine vision method for acquiring positional information based on four target elements.
Figure 10:
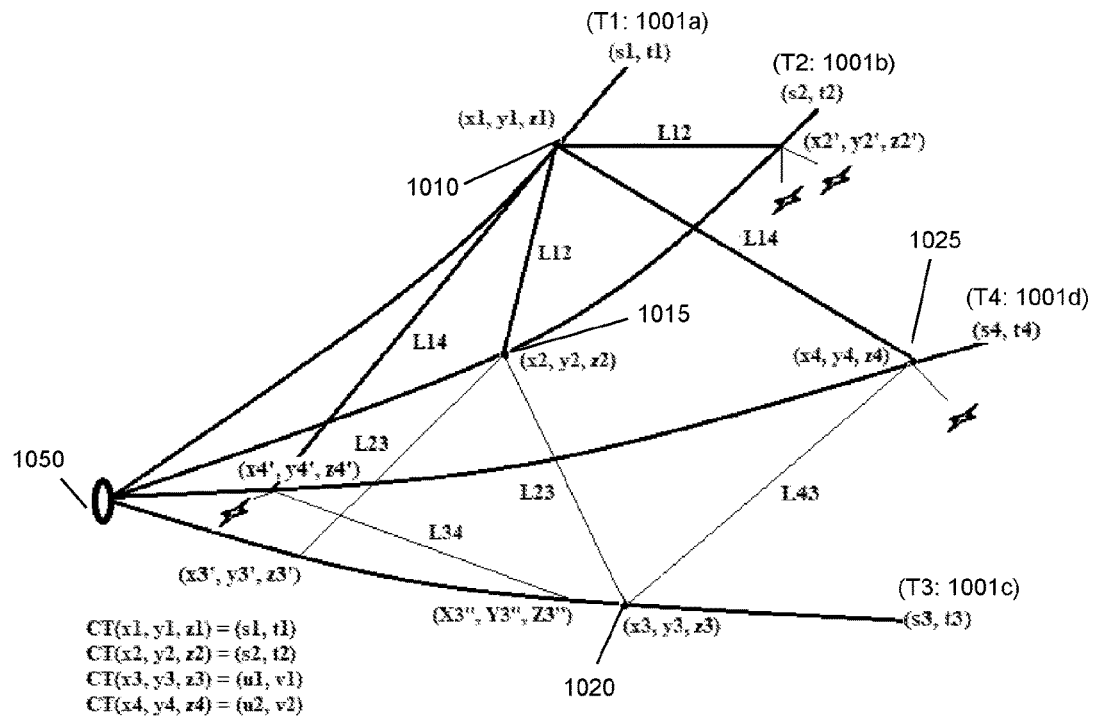

FIG. 10 (B) also illustrates the situation whereby 4 of the supposed 8 piers which originated from points on path of sight (s3, t3) were not illustrated as these piers were deemed too long to fit or too short to reach a relevant point on the other paths of sight. These missing piers are annotated using stars in this figure.

The main feature of the monocular vision is about how the calibration table is traversed to obtain the location of the target elements relative to the optical device. The method for generating the calibration table was described in detail in the previous paragraphs. There are potentially many search methods which are applicable.

Rectangular 4 Target Points Monocular Vision

In order for the search of the calibration table to be conducted in an efficient and convenient manner, target elements are provided at each corner or each of the vertices of a quadrilateral shape such as, but are not limited to, a rectangle, square, parallelogram, rhombus, kite, trapezium, or any other forms of irregular quadrilaterals. In the example illustrated in FIG. 11 (A), the target elements are arranged at the four corners of a rectangle which has a width Lv and a length Lh. Such an arrangement would be useful when the 4 targets elements are affixed on the ceiling and the optical device is looking upwards, with the image of the target elements being cast down onto the optical device's sensor. In addition to obtaining the location of the target elements by matching the lengths of the sides of the rectangle using values from the calibration table, a search of the calibration table may be performed by an interpolation process with the objective of matching the unit vectors as keys since the shape formed by the four target elements comprises 2 pairs of parallel line segments.

In the example illustrated in FIG. 11(A), Lh may be set to be 3 meters (i.e. representing the width of an aisle in the factory or warehouse), while Lv may be set to be 1 meter (i.e. representing the length along the direction of the aisle).

The optical device's sensor will then generate the (s, t) values for each of the four captured target elements, e.g. T1: (s1, t1), T2: (s2, t2), T4: (u1, v1), T3: (u2, v2), respectively. (x, y, z) values that correspond to these captured (s, t) values are then retrieved from the calibration table and used to plot 4 paths of sight as illustrated in FIG. 11(B). For example, target element T1 resides along the path of sight (s1, t1) as plotted using corresponding (x, y, z) values obtained from the calibration table. Connecting path of sight (s1, t1) to path of sight (u1, v1) are a series of piers (that are illustrated using lighter lines) whereby the length of each pier is Lh. Similarly, connecting path of sight (s2, t2) to path of sight (u2, v2), are a series of piers each also having a length Lh.

The solid line rectangle R1 shows a match that has occurred as: a) the top pier and the bottom piers are parallel, i.e. these two piers have the same unit vector relative to the optical device, b) the two piers are of the same length Lh, which is the case by how piers are identified, c) the two piers are Lv apart. The figure also demonstrates that as the calibration table is monotonic but nonlinear, there is a slight chance that the dotted line rectangle R2 matches condition a) and b). However, due to the monotonicity of the calibration table, condition (c) above will only be met by rectangle R1 and not rectangle R2.

In another embodiment of the invention, after the 4 paths of sight are plotted as described above, at a point along path of sight (s1, t1) that is at least 60 centimetres from the lens of the optical device (minimum vision range), a pier having a length Lh is plotted from path of sight (u1, v1) to path of sight (u2, v2).

The point along path of sight (s1, t1) is then moved a further 2 centimetres away from the lens and another pier having a length Lh is plotted from path of sight (s1, t1) to path of sight (u1, v1). The point is then moved yet another 2 centimetres away from the lens and another pier is plotted from path of sight (s1, t1) to path of sight (u1, v1) and this process repeats itself until the distance between the point and path of sight (u1, v1) is larger than length Lh.

A pier termination point on path of sight (s2, t2) that is furthest away from the optical device's lens is then selected. This point along path of sight (s2, t2) is then moved 2 centimetres nearer to the lens and a pier having a length Lh is plotted from path of sight (s2, t2) to path of sight (s1, t1).

The point is then moved yet another 2 centimetres nearer to the lens and another pier is plotted from path of sight (s2, t2) to path of sight (s1, t1) and this process repeats itself until the point along path of sight (s2, t2) is 60 centimetres away from the lens.

A list P12 containing the originating and termination points of all the plotted piers is then generated. The unit vectors of each pier relative to the lens' coordinates are also stored in list P12. List P12 would be sorted according to each pier's unit vectors due to the monotonicity nature of the optical device.

At a point along path of sight (s2, t2) that is at least 60 centimetres from the lens of the optical device, a pier having a length Lh is plotted from path of sight (s2, t2) to path of sight (u2, v2). The unit vector of this pier is then derived and list P12 is then searched using an interpolation search method to find a stored unit vector that matches with the derived unit vector. A match between two unit vectors occurs when absolute value of subtraction of unit vectors is smaller than a predefined value.

If a match is not found, the point along path of sight (s2, t2) is then moved further 2 centimetres away from the lens and another pier having a length Lh is plotted from path of sight (s2, t2) to path of sight (u2, v2). Similarly, the unit vector of this pier is then derived and the above described search is performed to find a match. This process is repeated until a match is found between the derived unit vector and a unit vector stored in list P12 or until the distance between this point and path of sight (u2, v2) exceeds the length Lh.

When this occurs, a pier termination point on path of sight (s2, t2) that is furthest away from the optical device's lens is then selected. This point along path of sight (u2, v2) is then moved 2 centimetres nearer to the lens and a pier having a length Lh is plotted from path of sight (s2, t2) to path of sight (u2, v2). The unit vector of this pier is then derived and the above described search is performed to determine if the derived unit vector and matches with a unit vector stored in list P12. If a match is not found, the point along the path of sight (s2, t2) is moved 2 centimetre nearer the lens and this process is repeated until a match is found between the derived unit vector and a unit vector stored in list P12.

Once the match has been found between the derived unit vector and a unit vector stored in list P12, the matched parallel piers are validated by verifying that the pair of piers have a distance of Lv, then the answers are found. Once the matched parallel piers are validated, as illustrated in FIG. 11(B), the end points of a pier as obtained from list P12 is found to be T1 having (x1, y1, z1) values on path of sight (s1, t1) and T4 having (x4, y4, z4) values on path of sight (s2, t2). The end points of the matching pier as obtained from the steps described above are T2 having (x2, y2, z2) values on path of sight (u1, v1) and T3 having (x3, y3, z3) values on path of sight (u2, v2).

Locating the Optical Device Relative to the Targets

Figure 12:
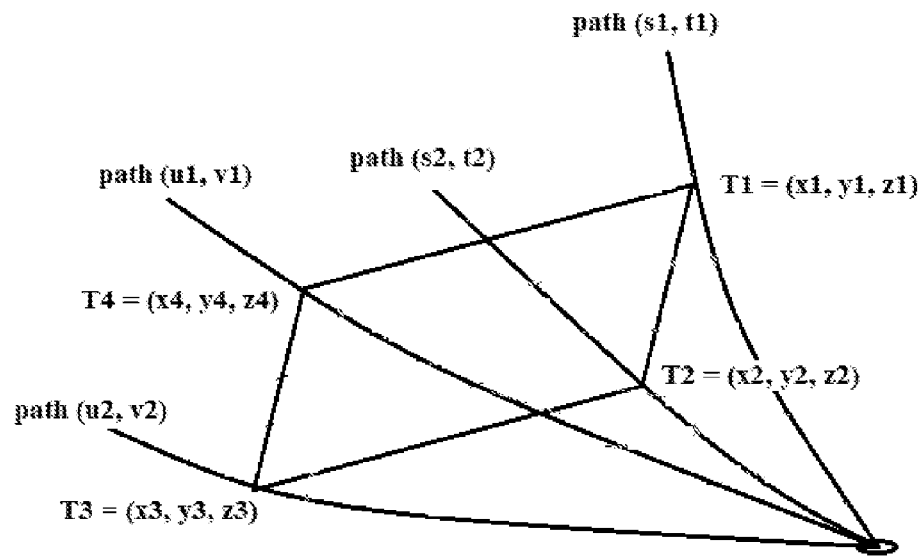
FIG. 12 illustrating an exemplary method of locating a location of the optical lens relative to the target elements in accordance with embodiments of the invention.
Figure 12:
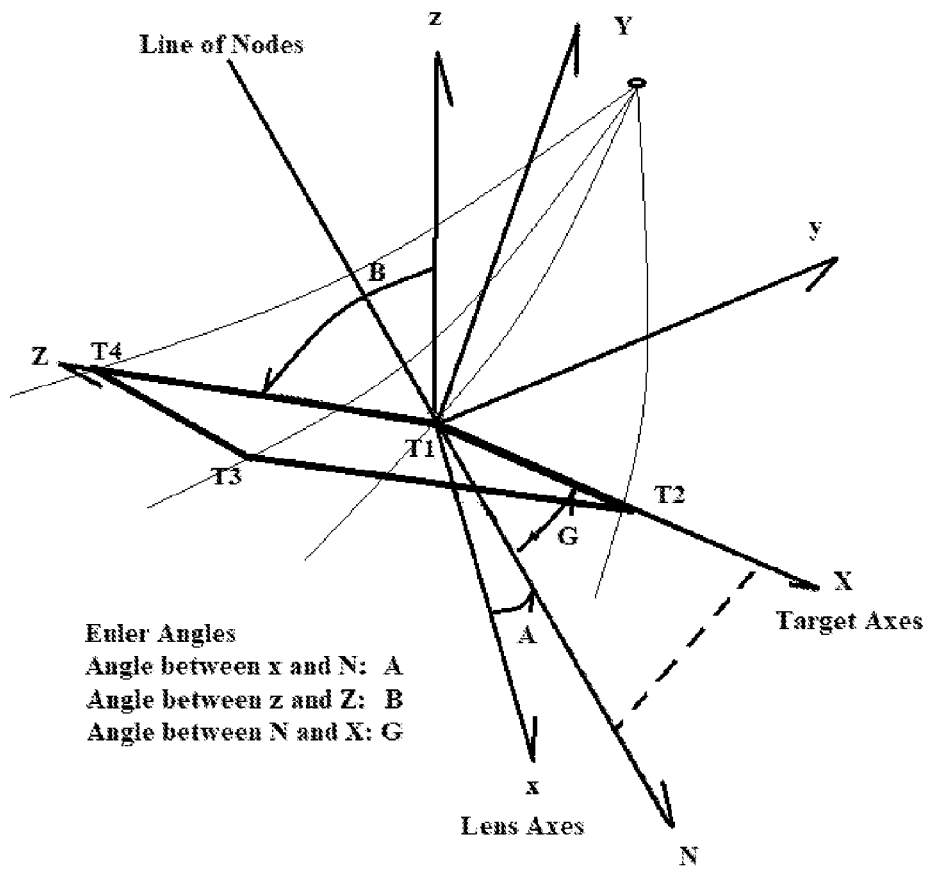

Upon obtaining the positions of the target elements, one may also proceed to determine the location of the target elements relative to the optical device. This is illustrated in FIG. 12. The locations of the four corners of the rectangle relative to the lens are shown as T1: (x1, y1, z1), T2: (x2, y2, z2), T3: (x3, y3, z3) and T4: (x4, y4, z4).

The first step is to translate the location of the rectangle with respect to the origin, which is the centre of the lens. Initially, the origin (0, 0, 0) is assigned to be at T1. It should be noted that the rectangle has 3 dimensions of angular freedom relative to the lens axes. This is illustrated in FIG. 12 (B). The projection of the T1-T4 line segment to the z=0 plane represents the line of nodes, and this allows the Euler A (alpha) B (beta) and G (gamma) angles to be designated. Pointing toward the lens from T1, the lens location is at $(-x1, -y1, -z1)$ relative to the origin at T1 with reference to the original axes. The (X1, Y1, Z1) values which represent the position of the lens relative to the axes coinciding with the target points which form the rectangle is derived via $-G$, $-B$, $-A$ Euler rotation. The detailed workings of Euler rotations are omitted for brevity as Euler rotations are well developed algorithms with publicized software modules known to one skilled in the art. When the monocular vision system is applied to a single optical device, knowing its location and orientation relative to a group of target elements is sufficient as it navigates its way using this group of target elements.

Locating the Optical Device Relative to the Global Reference

When the monocular vision system is employed in multiple devices, the administrator of the system would want to know the positions of all the devices in order to coordinate the tasks assigned to each device. Hence, it would be useful if each optical device is able to obtain its location relative to the system's global reference.

Figure 13:
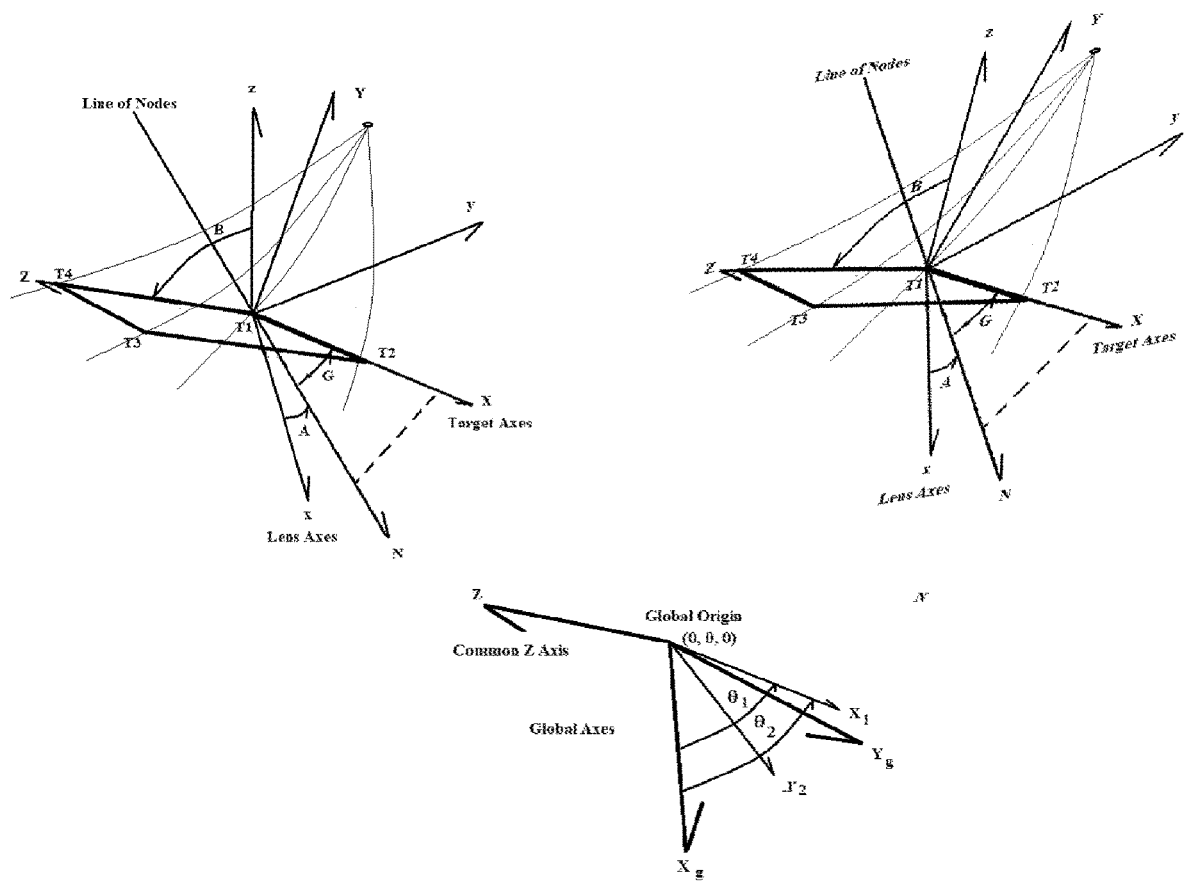
FIG. 13 illustrating an exemplary method of locating a location of the optical device relative to a global reference in accordance with embodiments of the invention.

Based on the method described above, positional translation and Euler angular rotation may be performed by each optical device. The 3 dimensional positional translations and 2 dimensional angular rotations can be simplified when such optical devices are deployed in regular plant and warehouse facilities as the z axis within such areas would be perpendicular to the ground. Once the (x, y, z) (A, B, G) of an optical device relative to 4 target elements is determined, the x, y and z values relative to said target shape can be translated with reference to the global origin, to $(x_1-X_1, y_1-Y_1, z_1-Z_1)$ and $(x_2-X_2, y_2-Y_2, z_2-Z_2)$, respectively as shown in FIG. 13. This shall be followed by an axis rotation in the Z plane, with the angular values of $-\theta_1$ and $-\theta_2$, respectively. Individual optical device positions can then be collected in an environment wide system.

Example of General Monocular Vision System Implementation for a Group of Target Elements Arranged as Vertices of a Rectangle.

An exemplary implementation of the general monocular vision system is described below with reference to FIG. 14. In this example, the target group comprising target elements T1, T2, T3, T4 are provided on a ceiling and once captured by the optical device sensor, causes the sensor to generate 4 pairs of sensor output readings, (3822, 165), (3964, 1796), (1325, 1657), (1236, 272), respectively as shown in FIG. 14 (A).

Figure 14A:
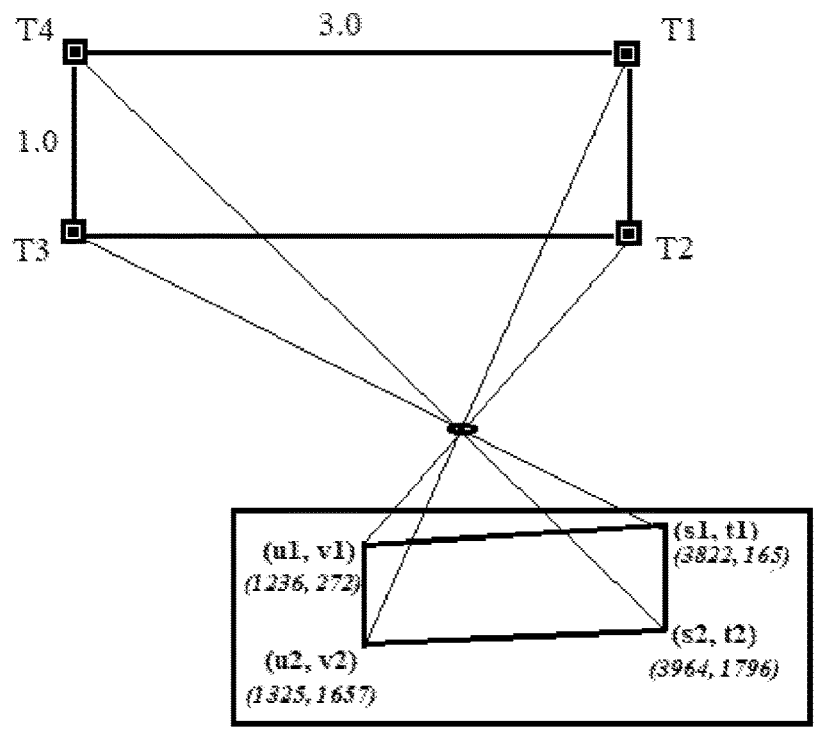
FIG. 14 illustrating an exemplary implementation of the general monocular vision system with rectangular target element group in accordance with embodiments of the invention.
Figure 14B:
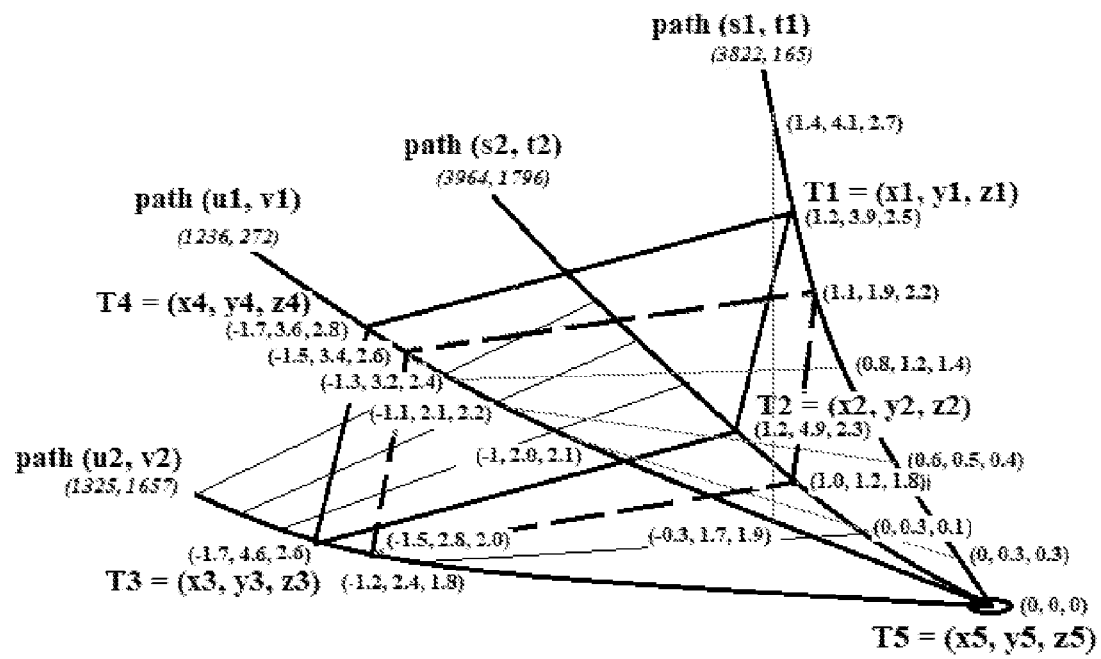

With reference to FIG. 14 (B), paths of sight (3822, 165) and (1236, 272) form the following piers (0, 0.3, 0.3) to (−1.0, 2.0, 2.1), (0.6, 0.5, 0.4) to (−1.1, 2.1, 2.2), (0.8, 1.2, 1.4) to (−1.3, 3.2, 2.4), (1.1, 1.9, 2.2) to (−1.5, 3.4, 2.6), (1.2, 3.9, 2.5) to (−1.7, 3.6, 2.8), and (1.4, 4.1, 2.7) to (−0.3, 1.7, 1.9), with each pier being 3 meters in length. These piers are then added to a list to be used later on.

Paths of sight (3964, 1796) and (1325, 1657) also form piers between them. Starting with the innermost point (0, 0.3, 0.1) along path of sight (3964, 1796), the pier (0, 0.3, 0.1) to (−1.2, 2.4, 1.8) is initially selected. The unit vector of this pier is then found to be (1.2, −2.1, −1.7)/3.

When the list of piers between paths of sight (3822, 165) and (1236, 272) is searched to obtain a unit vector that matches with (1.2, −2.1, −1.7)/3, the unit vector from this list that is found to be the closest match is the unit vector for the first pier which is (1, −1.7, −1.8)/3. The unit vector difference between these two unit vectors is (0.2, −0.4, 0.1)/3, with an absolute difference of 0.15, which means a difference of 15 centimetre exists for a line segment of 1 meter. The absolute differences of the unit vectors from the list significantly deviate from that of this pier.

The next incremental point (1.0, 1.2, 1.8) along path of sight (3964, 1796) is then selected and the pier formed from this point is pier (1.0, 1.2, 1.8) to (−1.5, 2.8, 2.0). The unit vector for this pier is found to be (2.5, −1.6, −0.2)/3. When this unit vector is compared to the list of piers, it is found that pier (1.1, 1.9, 2.2) to (−1.5, 3.4, 2.6) with unit vector (2.6, −1.5, −0.4)/3 is the closest match as there is only a 0.082 difference in absolute value between these two unit vectors.

When the distance between the point (1.0, 1.2, 1.8) along path of sight (3964, 1796) and the point (1.1, 1.9, 2.2) along path of sight (3822, 165) is calculated, it is found that the distance between these two points is about 0.81 metres. To recap, the distance between these two points should be 1.0 metres as illustrated in FIG. 14(A), i.e. the distance between T1 and T2.

The next incremental point (1.2, 4.9, 2.3) along path of sight (3964, 1796) is then selected and the pier formed from this point is pier (1.2, 4.9, 2.3) to (−1.7, 4.6, 2.6). The unit vector is calculated to be (2.9, 0.3, −0.3)/3. When this unit vector is compared to the list of piers between paths of sight (3822, 165) and (1236, 272), it is found that pier (1.2, 3.9, 2.5) to (−1.7, 3.6, 2.8) has a unit vector that matches the calculated unit vector.

When the distance between the point (1.2, 4.9, 2.3) along path of sight (3964, 1796) and the point (1.2, 3.9, 2.5) along path of sight (3822, 165) is calculated, it is found that the distance between these two points is about 1.02 metres. As this distance is close to 1.0 metres, the corresponding (x, y, z) values of these two points are taken as the actual location of these two points.

Hence, based on the above, it is determined that the 4 target elements form a rectangle and the locations of the four target elements are as follows: T1=(1.2, 3.9, 2.5), T2=(1.2, 4.9, 2.3), T3=(−1.7, 4.6, 2.6), T4=(−1.7, 3.6, 2.8), relative to the axes of the optical device.

General 4 Targets Walk Monocular Vision

Based on the general monocular vision system in which four target elements are deployed in a coplanar manner, a spatial walk is implemented. In this set up, the ceiling is marked with scattered target elements that are each about 2 meters apart. For a 10,000 square meter environment of which 25% comprises aisles, this would imply that there are 2,500 square meters of aisle space with ceiling marked targets at density of 1 target per 4 square meters. As a result, this means that there would be about 625 target elements deployed across the ceiling.

Figure 15:
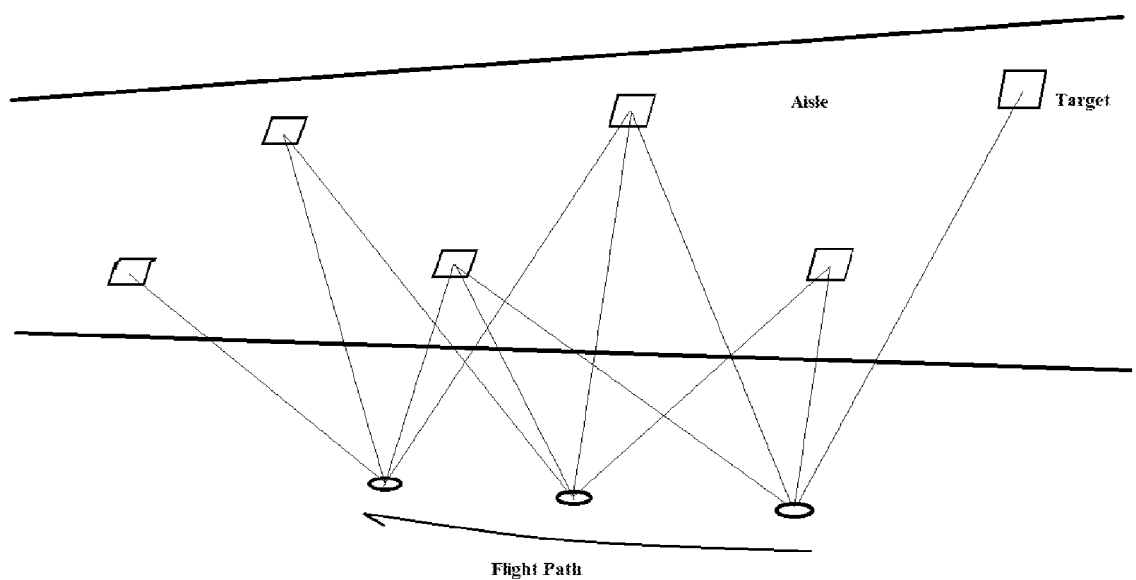
FIG. 15 illustrating a general four target element walk in accordance with embodiments of the invention.

In such a setup, it is simpler to read the labelled number from the target and look up the global coordinates from a table than to read the coordinate information from the target element's label. At any time, the optical device will capture at least 4 target elements to form a target group. In such an implementation, the system no longer moves from one target group to the next (Spiderman's cruise). Instead, it releases the backend target and proceeds to capture a next target element forming a new 4-target element group (like an animal walk). This is illustrated in FIG. 15. The forward moving style seems to imitate that of a 4 legged robot.

One skilled in the art should note that this is not a physical release and grab. At any instance, the machine vision system will select a group of 4 target elements to perform positional analysis. Such an approach involves more computational effort for a general 4 target element group (instead of a rectangular shape). However, it makes the best advantage of target elements that are spread out across in its field of view and as result, increases the positional accuracy of the system.

Implementation of Computational Structure, General 4 Target Points

Figure 16:
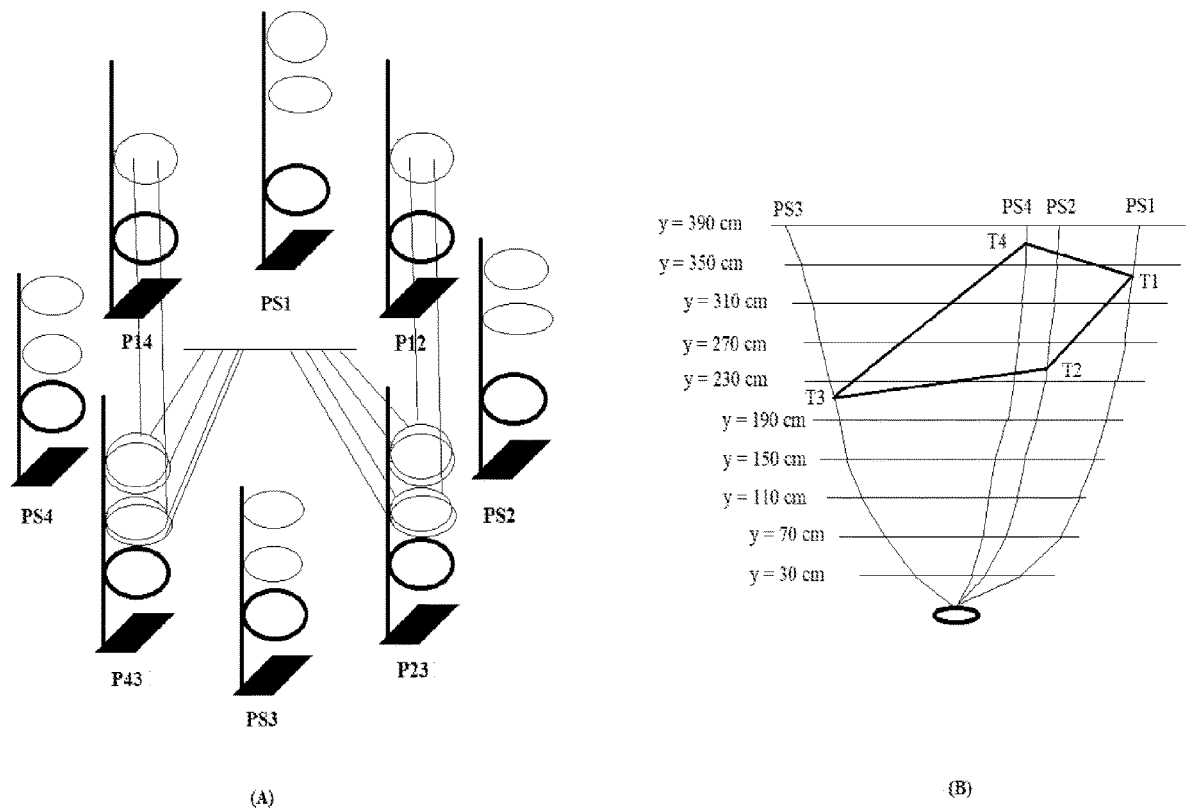
FIG. 16 illustrating a general four target element monocular vision computation structure.

FIG. 16 (A) illustrates data being stored in a data structure framework whereby this data may comprise information such as data about the piers (e.g. P12, P23, P43) to solve the spatial walk monocular vision positioning. This approach has been tailored for use with 4 general coplanar target elements and not for a group of target elements arranged in rectangular manner.

As mentioned in the previous section, the optical device has its own calibration table which has been populated by the optical device sensor's readout, i.e. (s, t) values and these sensor readout values are associated with their (x, y, z) location which in turn represents the locations of the captured target element in the field of view of the optical device. It should be noted that the sensor's readout may or may not be an integer, as a pixelated interpretation method may be applied to the sensor's readings to increase the accuracy of the reading.

For example, under the assumption that a captured image of a target element generates a (s, t) value, i.e. (s1.5, t1.5), that comprises decimal numbers, it is possible that one may not find a (s, t) value in the calibration table that is an exact match with the generated (s1.5, t1.5) value. Instead, from the calibration table, one may only be able to find 4 neighbouring (x, y, z) locations with the same y-value whereby each location has an associated sensor readout (s, t) value that is a close match with the generated (s1.5, t1.5) value. That is, the following 4 neighbouring locations may be obtained from the calibration table (x−1, y, z−1), (x−1 y, z), (x, y, z−1), (x, y, z) such that the (s, t) values associated with each of these 4 neighbouring locations closely matches with the generated sensor value (s1.5, t1.5) but does not equal it exactly. A spatial interpretation process is then carried out using these 4 neighbouring locations and their associated (s, t) values to calculate the optimal x, and z such that the target located at (x, y, z) shall be equal to (s1.5, t1.5), where s, t, x, z comprise decimal numbers and y is an integer number.

Hence, under the assumption that a target element T1 is located in the optical device's field of view, the path of sight PS1 as shown in FIG. 16 (B) represents all the short line segments between the points which has an integer y, decimal x and decimal z such that the spatially interpreted (s, t) based on the calibration table equals the pixelated interpreted (s, t) based on the image on the sensor. In this illustration, the y-axis represents an orthogonal distance from the optical device to the target element. This illustration also assumes that the y-axis values are integer numbers while the x and z values comprise numbers having decimal digits. All the points along path of sight PS1 may be stored in data structure PS1 as illustrated in FIG. 16 (A). Paths of sights PS2, PS3 and PS4 respectively represent the other 3 paths of sight and the points that make up these paths of sights may also be stored in their associated data structure PS2, PS3 and PS4 respectively. While PS1, PS2, PS3 and PS4 contain paths of sight information with integer values of y, note that the paths are formed by connecting the neighbouring points. A point on the paths of sight can have decimal y values, and in such case, the corresponding x and z values are linearly interpolated from the 3 dimensional coordinates of 2 neighbouring points with integer y.

As previously described, a plurality of piers is plotted between each path of sight whereby the length of each pier is equivalent to the distance between the target elements that are provided on each respective path of sight. For example, data structure P12 contains information about a plurality of piers that connect paths of sight PS1 and PS2 whereby the length of each pier is equivalent to the distance between the target elements T1 and T2.

In embodiments of the invention, the data in each of these data structures may be organized according to the y-values of the originating or termination points of the piers. For example, in data structure P12, each pier may be represented by a pair of y-values, the first value which is the originating y-value, which represents the originating point of the pier in path of sight PS1 and the second value which is the termination y-value, which represents the termination point of the pier in path of sight PS2. Note that these y values can be integer or decimal.

Similarly, using the method described above, data structures P23, P34 and P41 may be populated with information about the piers that connect paths of sight PS2 to PS3, PS3 to PS4 and PS4 to PS1 respectively. It should be noted that the length of the piers in data structure P23 are determined by the distance between target elements T2 and T3, the length of the piers in data structure P34 are determined by the distance between target elements T3 and T4 and the length of the piers in data structure P41 are determined by the distance between target elements T4 and T1.

All the above 8 data structures may be built in advance once the optical device's sensor readings have generated the respective (s, t) values for each of the target elements, e.g. (s1, t1) for target element T1, (s2, t2) for target element T2, (s3, t3) for target element T4 and (s4, t4) for target element T4.

The steps involved in obtaining a positioning solution is initialized by first selecting a first entry (or pier) in P12 (i.e. a pier originating from PS1 and terminating at PS2). The termination point of this pair of piers is then linked to 2 entries in P23. The 2 termination points along path of sight PS2 are then linked through P23 to 4 terminal points in PS3. These entries form the first group of entries.

Another group of entries are then created as follows. The originating point of the first pier as selected from P14. The termination point of this pair of pier is then linked to 2 entries in P43. The 2 termination points along path of sight PS4 are then linked through P43 to 4 terminal points in PS3. These entries form the second group of entries.

When a match is found between the two groups of entries, the matched points are then checked using the distances between target element T1 and target element T3, target element T2 and target element T4, respectively to verify that a match has truly been found.

FIG. 16 (A) interprets how such data structures may be utilized to achieve the required resolution. The calibration table comprises of integer grids that are approximately 8 cubic centimetres apart and each of these grids represents a (s, t) reading and their associated (x, y, z) location. Such (s, t) readings comprise decimal numbers that are derived from pixelated interpretation.

In operation, when a (s1, t1) value associated with a target T1 is generated by the optical device's sensor, this (s1, t1) value would not match exactly with the decimal readings in the table. However, when the y-axis value is fixed, it is possible for 4 positional locations (x−1, y z−1), (x−1, y, z), (x, y, z−1), (x, y, z) to be obtained such that the 4 positional locations have associated (s, t) values that are closest to (s1, t1). These 4 positional values are then utilized to obtain the (x', y, z') value associated with (s1, t1)

The spatial interpretation methodology is then employed to find x' between x−1 and x, z' between z−1 and z such that (x', y, z')=(s1, t1). Note that in such a situation, an (x, y, z) location would contain actual integer values, while in the case of (x', y, z')=(s1, t1), x' and z' may be decimal numbers derived from spatial interpretation, as calculated from grids in the calibration table. In such a data structure implementation, y is always an integer as y was selected to be constant. In between the 2 neighbouring y values, the paths of sight are represented as straight lines as only linear interpretation was employed. FIG. 16(B) illustrates y values that are incremented in 40 cm steps and one skilled in the art will recognize that this is done for illustration purposes only.

As the process proceeds to generate the 3-dimensional positional values, the fitting of piers between the respective paths of sights are done using linear interpretation techniques. Hence, the content in data structure P12 would comprise values of y in decimal numbers. Contents from data structure P23 would then be utilized to interpolate 2 neighbouring piers (represented by double ellipses in P23 and P43) to obtain the y values of the base of the piers on PS3.

Figure 17:
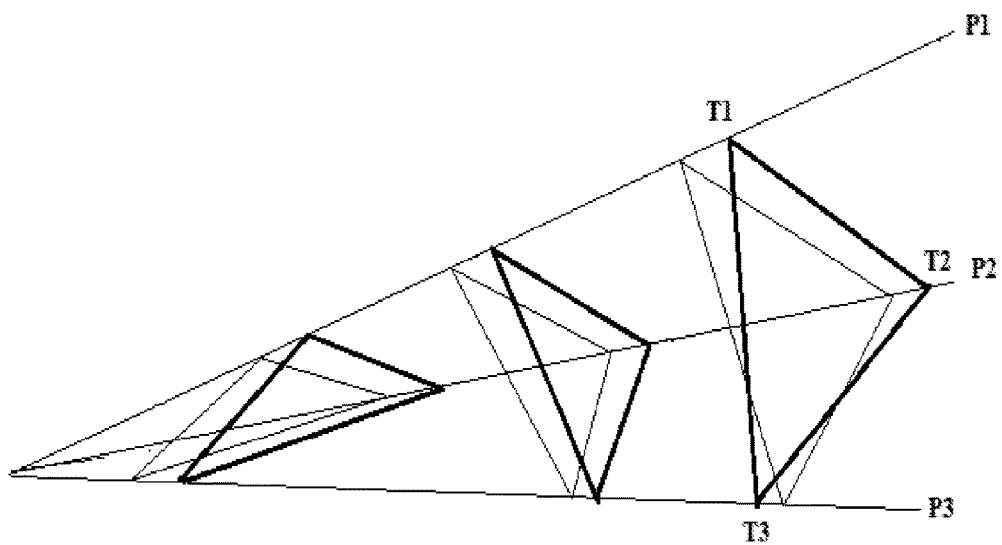
FIG. 17 illustrating a "slide" analysis showing that when one point of the 3 points shape moves incrementally along the path of sight, an incremental match for the other 2 points on the other 2 paths of sight does not occur if the shape is retained, except for "flip and slide", in accordance with embodiments of the invention.

Another Embodiment of the Invention: Three Target Element Search Augmented with the Fourth Target Element The analysis for a group comprising 3 target elements concludes that even though uniqueness cannot be established by simply utilizing only 3 points, all matched positions are usually coupled with flip positions, instead of infinite number of matches. When straight line paths of sight (for example with device without lens) are utilized, it can be shown that the 3 groups of target elements are locked in place by the paths. The rigid triangle is allowed to flip, but not allowed to slide along the paths while maintaining its shape and size. FIG. 17 demonstrates the scenario whereby 1 of the 3 points slide incrementally. In order to keep the lengths of the triangle constant, the other 2 points will have to change accordingly. The analysis shows that the shape will change when 1 of the 3 points slides incrementally along its own path of sight. This is an important property which may be utilized to obtain a unique solution for a 4 target element group.

Figure 18:
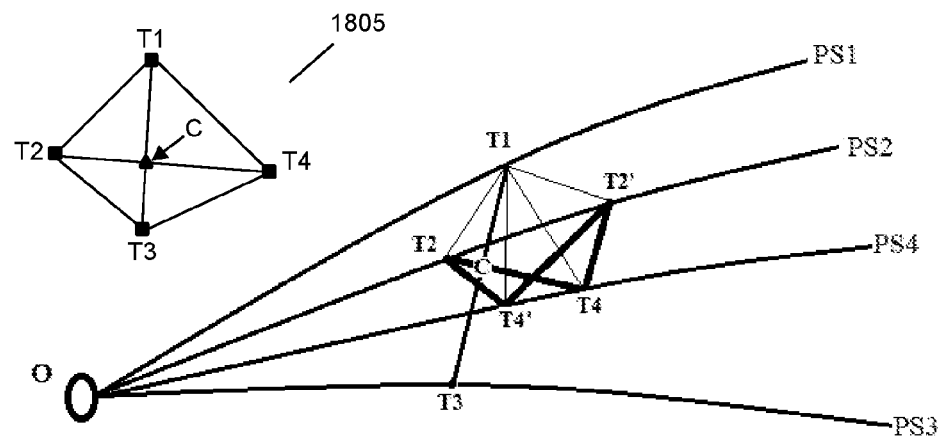
FIG. 18 illustrating an embodiment of the general monocular vision system whereby three target elements are initially utilized to obtain the positional data, whereby the fourth target element is used to verify the acquired data.

FIG. 18 illustrates the 3 points match search embodiment for a group comprising four target elements (T1-T4) whereby each of these target elements make up the corner or each of the vertices of a quadrilateral polygon. Starting from an arbitrary point T1 on path of sight PS1, one may find up to 2 flip positions on path of sight PS2, i.e. points T2 and T2', such that piers may be established between points T1-T2 and T1-T2'. It is useful to note that the length of piers T1-T2 and T1-T2' are identical. By the same token, up to 2 flip positions may be found on path of sight PS4, i.e. points T4 and T4', such that piers may be established between points T1-T4 and T1-T4'. Note that piers T1-T4 and T1-T4' are of the same length.

The distance between the base points of a pair of piers derived from the starting point is defined as the base distance, e.g. base distance of pair of piers T1-T2 and T1-T4 is the length between T2 and T4. If the base distance is found to be equal to the actual length between target elements T2 and T4, then this implies that a possible match for the 3 points positioning methodology has been found. As this starting point, e.g. T1, is moved away from the optical device along path of sight PS1, all of the up to 4 base distances shall increase due to the monotonicity of the optical device, except that at the end of the path of sight, the flipping pairs will start to join and at a certain distance away from the optical device, the base distance decreases slightly until the pier is unable to reach a corresponding path of sight.

Hence, the base distances for the pairs of piers are evaluated as the starting point T1 is moved incrementally away from the optical device along its path of sight. As the starting point T1 is moved, the base distances of the piers between paths of sight PS2-PS4 are matched to the actual length between target elements T2 and T4. Once a match is found, the 3 targets points are potentially found.

In this embodiment of the invention, for these four target elements T1-T4 (1805), it can be seen that pier T1-T3 will intersect or cross with pier T2-T4 and this intersection/crossing point is hereinafter identified as crossbow point C. Point C can also be identified as the intersection/crossing point of the two diagonals of the quadrilateral polygon 1805 where a diagonal refers to a line segment that joins two vertices of quadrilateral polygon 1805 whereby these two vertices may be provided on different edges, e.g. see FIG. 18 where T1 to T3 or T2 to T4 intersects at C, or alternatively, these two vertices may be provided on the same edge, e.g. see FIG. 20 (C) where T1 to T3 and T4 to T2 intersects at C. One skilled in the art will recognize that the target elements may be renumbered without departing from this invention. As long as the group of target elements comprises at least four target elements whereby the target elements make up the vertices of the quadrilateral polygon, a crossbow point C may be used to represent the crossing point of the diagonals of the quadrilateral polygon.

Figure 20:
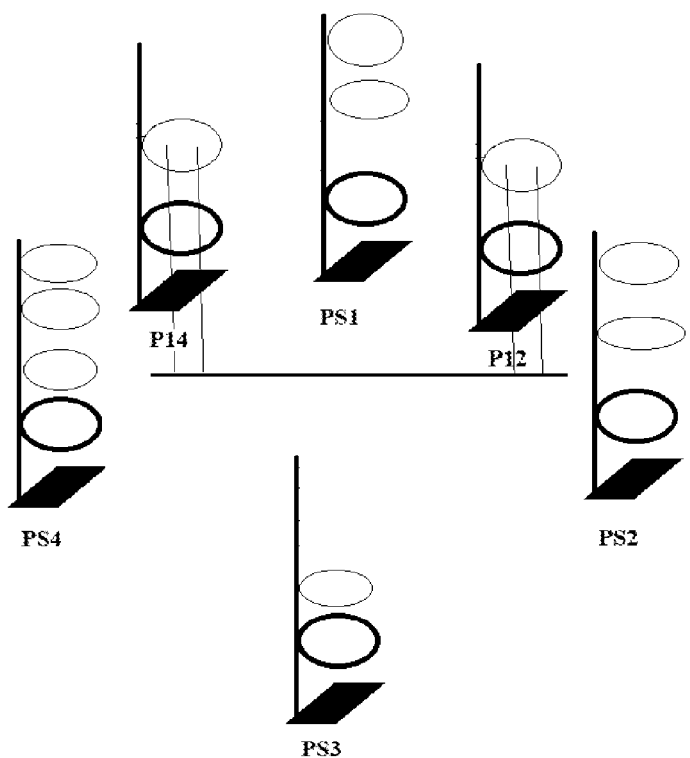
FIG. 20 illustrating an exemplary method of locating a location of the optical device relative to three target elements whereby a fourth target element is utilized to confirm the obtained location in accordance with embodiments of the invention.
Figure 20:
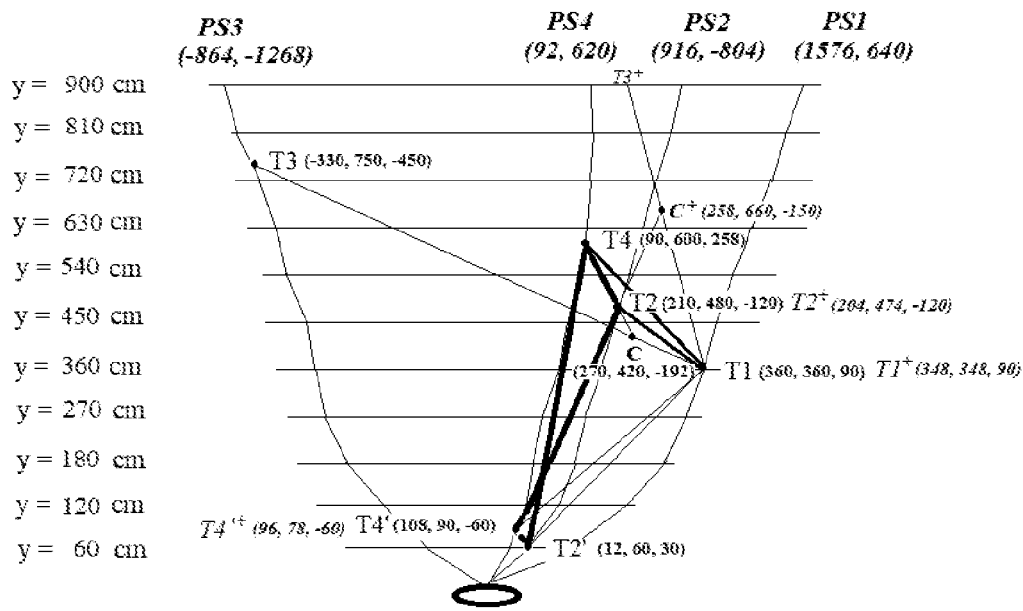
Figure 20:
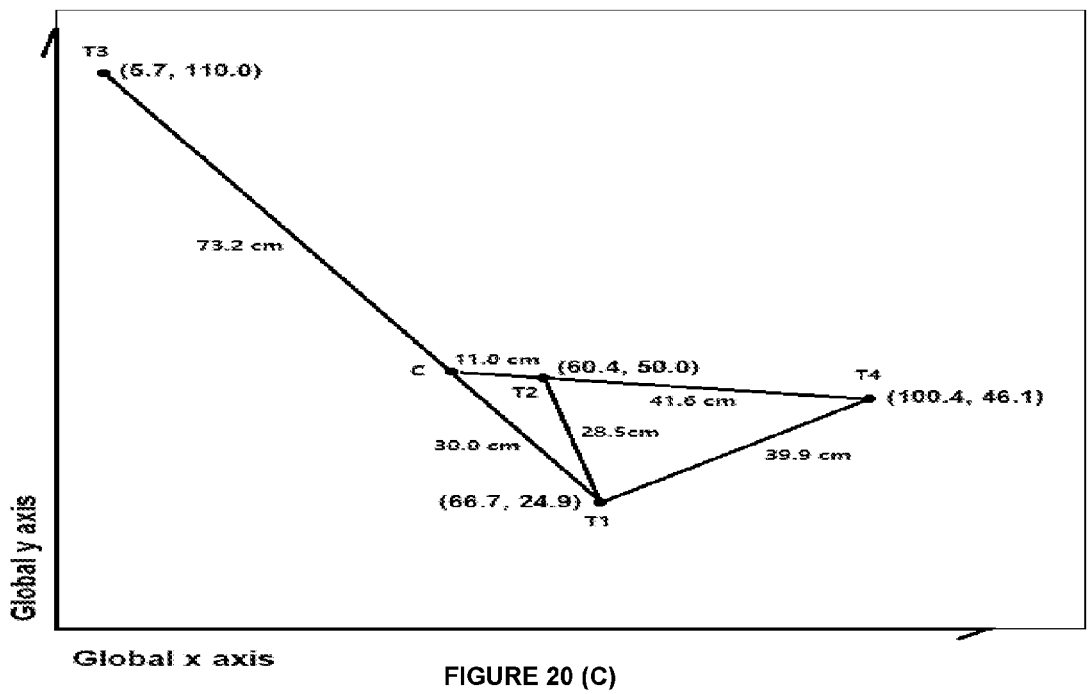

As discussed in the previous sections, the global positions of each of the target elements and the relevant constraining rules may be obtained or read from any one of the target elements. In an area where the entire plane of the ceiling is at the same height and is horizontal, the target elements on the ceiling may be specified by (x, y) coordinates (as z is a fixed value) which represent the global x and y axes respectively. In such a scenario, the reference point of the global x and y coordinates may comprise a pre-agreed location on the ceiling. The relevant x and y values can then be obtained via machine Braille code as provided at the target elements, or by labels at the target elements whereby the labels reference x and y information stored in a table as part of a predetermined database for machine vision and intelligence. With reference to FIG. 20 (C), it is shown that global x and y coordinates for all target elements can be readily set out in a table and retrieved as required. Such a table will not set out the physical location of the target element relative to the optical device instead; it may only be used to calculate the crossbow ratio "C" or the crossing/intersection point "C".

In an embodiment of the invention, the crossbow ratio C may be defined as Distance(T4, C)/Distance(C, T2) whereby Distance(T4, C) defines the distance from target element T4 to point C and Distance(C, T2) defines the distance from target element T2 to point C. The bow ratio is determined to be Distance(T3, C)/Distance(C, T1). Once these two ratios have been obtained, they can then be used with the physical locations of T1, T2 and T4 to determine the physical location of T3. Note that the function Distance can be negative and Distance(A, B)=−Distance (B, A). The application of the crossbow will be described in the actual example below.

One skilled in the art will understand that various other methods or means may be utilized to convey the location of point C in relation to any of target elements T1-T4 without departing from this invention such as, but not limited to, the distance of any of the target elements to point C.

Returning to the example illustrated in FIG. 18, based on the global locations of target elements T1, T2, T3 and T4, two diagonals are plotted. The first diagonal comprises a line from T1 to T3 while the second diagonal comprises a line from T2 to T4. Based on the intersection point or crossing point of these two diagonals, the location of crossbow point C is calculated to be at a particular ratio from T4 and T2 or at a particular distance from T4 and T2. Based on the obtained location of point C, a point C is then plotted in FIG. 18 amongst the paths of sights PS1-PS4 at the appropriate point along pier T2-T4. A straight line is then drawn from point T1 to point C and this line is extended beyond point C until the desired ratio is reached for a possible location, (x, y, z) of T3. If this point falls on path of sight PS3, it is likely that the correct point has been found. Nevertheless, in order to validate this point, the (x, y, z) value from the calibration table is read to see if the output sensor value (s, t) associated with the possible location of T3 matches with a point along path of sight PS3. If this occurs, this means that the answers to all 4 target elements have been obtained.

The method above may be summarized as follows. From a starting point T1 on path of sight PS1, one may find 2 piers, T1-T2 and T1-T2', to path of sight PS2. Starting from the same starting point T1 on path of sight PS1, 2 other piers are found, T1-T4 and T1-T4', to path of sight PS4. If one of the pier lengths of T2-T4 or T2-T4' or T2'-T4 or T2'-T4' matches with the actual length between target elements T2 and T4, this implies the likelihood that these three points may be at the appropriate positions for three target elements. This potential solution is then verified by finding the location of the final target element, i.e. T3, in the optical device's three dimensional coordinate system using the crossbow "C" method as described above. The location of C is first obtained from the global positions of the four target elements. Once this is done, the crossbow point C is then used to plot a possible location for the final target element, i.e. T3. The corresponding output sensor value (s, t) associated with this possible location of T3 is then retrieved from the calibration table and if this output sensor (s, t) value matches with the (s, t) values on path of sight value PS3, this implies that the locations of all the four target elements have been found. As explained in the section on uniqueness of solutions, the testing of the T3 location also eliminates the chance of multiple solutions due to individual lens intrinsic.

Figure 19:
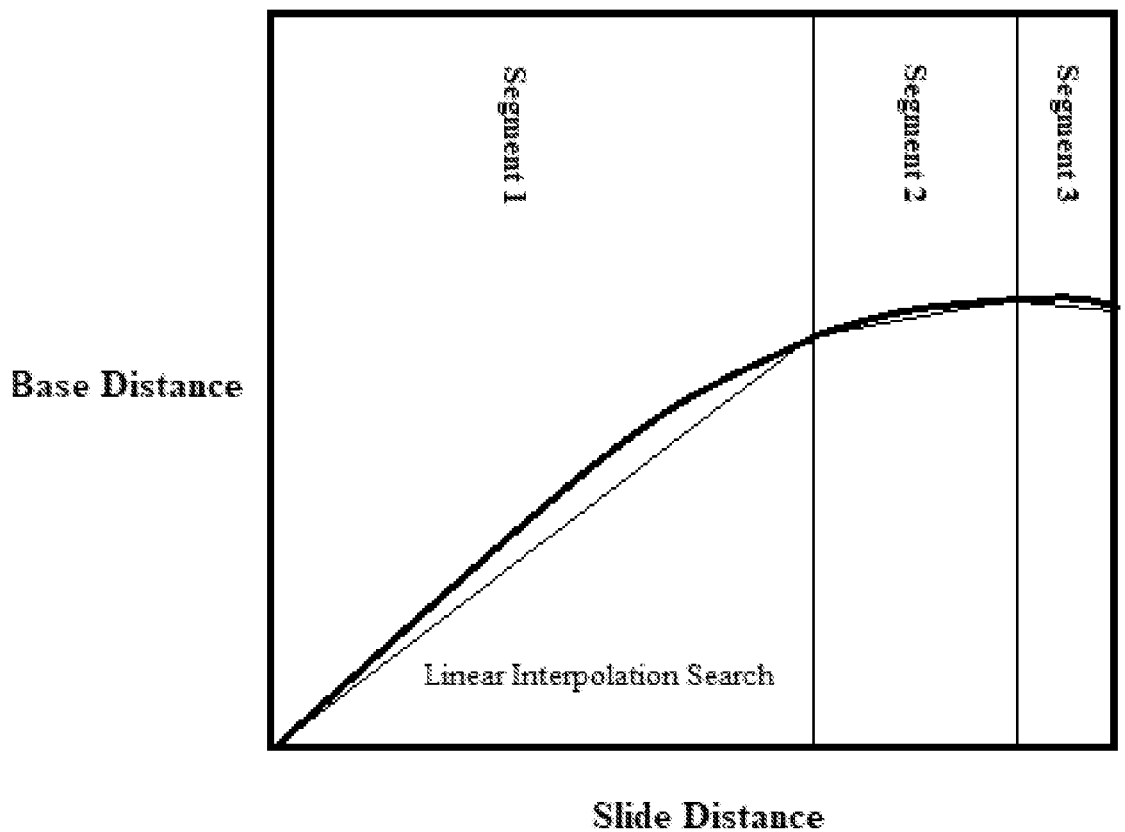
FIG. 19 illustrating an embodiment whereby the positioning of a point on a path of view from the optical device is plotted using a linear interpolation search method based on the variable of certain reference distance.

Since the base distances (e.g. T2-T4) change continuously as the starting point moves, base distances can be used as parameters for searches to obtain the match point. To have a better search result, one may divide said function into segments, with different slopes. In majority of cases, as the starting point T1 on path of sight PS1 proceeds outward, the base point on path of sight PS2 or path of sight PS4 slows down and slightly traverses in a reverse direction till a dead stop, where the distances between the bridges become larger than the piers. This is illustrated in FIG. 19. Interpolation search can be performed with a slope based on which segment the starting point is in.

Example: General Monocular Vision 3 Targets Augmented by 1 Target

An example of general monocular vision that utilizes a 3 target elements search augmented by 1 other target element is described herein with reference to FIG. 20. In this example, it is assumed that a quadrilateral shape having corners T1, T2, T3 and T4, is placed in front of the optical device O. Optical device O is assumed to have a sensor array with 20 million pixels, ranging from −2500 to 2500 horizontally and −2000 to 2000 vertically. The distance of field of view for the lens is miniaturized from 60 centimetres to 900 centimetres.

At the first step, the optical device generates a value of (s1, t1)=(1576, 640) and this represents all segments along the path of sight PS1; a value of (s2, t2)=(916, −804) for all segments along path of sight PS2; a value of (s4, t4)=(92, 620) for all segments along path of sight PS4 and a value of (s3, t3)=(−864, −1268) for all segments along path of sight PS3.

FIG. 20(A) illustrates the data structure that may be utilized for performing the matching steps. Four paths of sight PS1, PS2, PS3 and PS4 are built up and this is done by using the above mentioned sensor values together with spatial interpretation methodologies to obtain the associated (x, y, z) values from the calibration table of the optical device.

A plurality of piers P12 is then built up between paths of sight PS1 and PS2 with each of these piers having lengths that equal the actual distance between target elements T1 and T2. Piers P14 is similarly built up between paths of sight PS1 and PS4 with these piers having lengths that equal the actual distance between target elements T1 and T4. These piers are composed of mostly pairs of flip piers. For any starting point on PS1, there can be up to 2 pier terminating points on path of sight PS2 and from each of these points of path of sight PS2 up to 2 pier terminating points on path of sight PS4. Hence there are up to 4 piers that connect the points between path of sight PS2 and path of sight PS4.

For a start, a point closest to the optical device is initially selected and this point is incrementally moved further away from the optical device till the length of the piers between the paths of sight PS2 and PS4 exceed the actual distance between target elements T2 and T4. The lengths of the 4 segments between the T2 or its flip point T2' and the T4 or its flip point T4' for each of the starting points are then recorded as an attribute in data structure PS1. It is found that when T1 is at (360, 360, 90), the length of the segment between points T2 and T4 is 414.6 cm, which is equal to the distance between the target points T2 and T4. The matched T1, T2 and T4 points are as indicated in FIG. 20 (B). The flip points of such matches are as indicated with T2' and T4'.

One also observes that the flip point T4' and T2 forms a segment with length of 407.4 cm. Such a close match and situations as illustrated in FIGS. 9 (A) and (B) demonstrate that the match results from 3 target point matches are required to be put to test based on constraining relations with point T3. It is useful to note at this stage that although the length of the line between T2-T4' appears much longer than the line between T2-T4 in FIG. 20(B), the lengths of these two lines are actually almost the same. This is because FIG. 20(B) is a two dimensional representation of the paths of sight whereas in actual implementation, the paths of sights PS1-PS4 are actually arranged in a three-dimensional manner, and are not co-planar as may be misunderstood from the illustration in FIG. 20(B). In other words, this means that the point of T4 could actually be a point "above" or "inside" the drawing of FIG. 20(B).

As line segment T1 to T2 is close to a flipping point, when T1 is slid down to T1 at the location (348, 348, 90), in order to maintain a pier with a length of 284.4, T2 shall not change as much, i.e. to T2+=(204, 474, −120). Line segment T1 to T4', on the other hand, is at a large angle from the flipping so T4' slides further to T4'+=(96, 78, −60) in order to maintain the pier length at 398.4. The combination of a smaller shift for T2 to T2+ and a larger shift for T4' to T4'+ results in an increased distance between T2+ and T4'+, to 414.6, which is equal to the distance between target elements T2 and T4. Hence, the path T1+ to T2+ to T4'+ produces a second match.

With reference to FIG. 20 (C), it can be seen that global x and y values for all targets can be readily obtained either read directly from the target element or from a global table as shown in parenthesis. The pair of crossbow ratios are determined to be −11.0/52.6=−0.21 and 73.2/30.0=2.44, respectively.

Based on this information, point C+ is then plotted at the appropriate point along pier T2+-T4'. This crossbow positioning method puts the crossbow tip C*at (258, 660, −150). A straight line is then drawn from point T1 to point C+ and this line is extended beyond point C+ to find a possible point for T3. However, this shoots T3+ off beyond the field of view in the y direction and does not intersect with PS3. This means that the proposed points T1+T2+T4' are not a valid match.

The 3 labelled target elements T1, T2 and T4 are matched to be at (360, 360, 90), (210, 480, −120) and (90, 600, 258), respectively. Based on the information obtained earlier about the point C, another point C is then plotted at the appropriate point along pier T2-T4 and is calculated to be (270, 420, −192). A straight line is then drawn from point T1 to point C and this line is extended beyond point C. Based on the ratio of point C from T3 and T1, the point, T3 is calculated to be (−330, 750, −450). The x, y, z coordinates of T3 relative to the optical device is then checked against the calibration table. It is then found from the calibration table that the coordinate of T3 at (−330, 750, −450) is associated with s, t values of (−864, −1266) and this implies that T3 is on the path of sight PS3 and this means that the locations of the four target elements have been found.

Positioning Resolution

It is useful to recap that the resolution on positioning depends on the size and distance of the target groups and also is proportionated to calibration table density. For ideal cases where the disparity angles between the targets are 30° to 60° and the calibration table is designed to capture every 8 cubic centimetre, the above examples are designed to derive 2 centimetres positioning resolution. For implementations whereby the calibration table records readings every 1 centimetre or 4 centimetres for cost optimization purposes, the resolution shall would increase or decrease respectively. Such resolutions, however, can be improved by an order of a magnitude by a second iteration on bridge matchings with 10 times refined increments on starting points in the range of plus and minus 1 one unit length of the calibration table. Since the second iteration only spans 20 locations, the calculation time shall not exceed that for the first iteration.

Components of a Processing System

Figure 21:
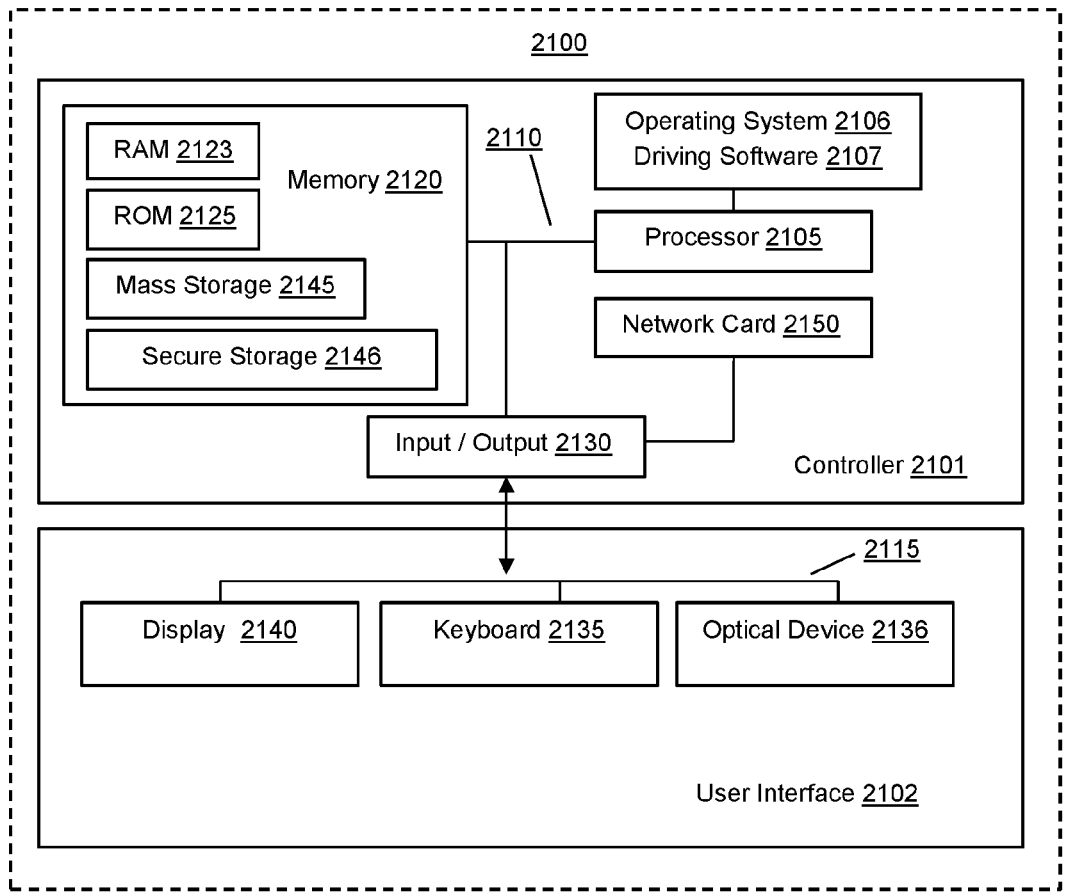
FIG. 21 illustrating a block diagram representative of processing systems providing embodiments in accordance with embodiments of the invention.

FIG. 21 illustrates a block diagram representative of components of processing system 2100 that may be provided within any computing devices for implementing embodiments in accordance with embodiments of the invention. One skilled in the art will recognize that the exact configuration of each processing system provided within these modules and servers may be different and the exact configuration of processing system 2100 may vary and FIG. 21 is provided by way of example only.

In embodiments of the invention, module 2100 comprises controller 2101 and user interface 2102. User interface 2102 is arranged to enable manual interactions between a user and module 2100 and for this purpose includes the input/output components required for the user to enter instructions to control module 2100. A person skilled in the art will recognize that components of user interface 2102 may vary from embodiment to embodiment but will typically include one or more of display 2140, keyboard 2135 and optical device 2136.

Controller 2101 is in data communication with user interface 2102 via bus group 2115 and includes memory 2120, processor 2105, hardware/firmware 2108 mounted on circuit boards that processes instructions and data for performing the method of this embodiment, an operating system 2106, driving software 2107, an input/output (I/O) interface 2130 for communicating with user interface 2102 and a communications interface, in this embodiment in the form of a network card 2150. Network card 2150 may, for example, be utilized to send data from electronic device 2100 via a wired or wireless network to other processing devices or to receive data via the wired or wireless network. Wireless networks that may be utilized by network card 2150 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 2120 and driving software 2107/operating system 2106 are in data communication with CPU 2105 via bus group 2110. In embodiments of the invention, optical device 2136 may be configured to be in direct communication with memory 2120 via bus group 2110. The memory components include both volatile and non-volatile memory and more than one of each type of memory, including Random Access Memory (RAM) 2120, Read Only Memory (ROM) 2125 and a mass storage device 2145, the last comprising one or more solid-state drives (SSDs). Memory 2120 also includes secure storage 2146 for securely storing secret keys, or private keys. It should be noted that the contents within secure storage 2146 are only accessible by a super-user or administrator of module 2100 and may not be accessed by any user of module 2100. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 2120 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 2105 may be provided by any suitable logic circuitry for receiving inputs, processing them in accordance with instructions stored in memory and generating outputs (for example to the memory components or on display 2140). In this embodiment, processor 2105 may be a single core or multi-core processor with memory addressable space. In one example, processor 2105 may be multi-core, comprising—for example—an 8 core CPU.

The above is a description of embodiments of a system and process in accordance with the present invention as set forth in the following claims. It is envisioned that others may and will design alternatives that fall within the scope of the following claims.

The invention claimed is:

1. A system for determining, in an optical device's three dimensional coordinate system, locations of target elements within the optical device's field of view, the system comprising:

the optical device being configured to:

capture images of four target elements whereby each target element forms a corner of a quadrilateral polygon, and obtain a set of constraining rules from the captured images;

generate a sensor output for each of the four target elements whereby each sensor output defines a two-dimensional representation of the captured image of the target element on the optical device's sensors;

a computing device communicatively coupled to the optical device, the computing device being configured to:

create a path of sight for each of the four target elements based on the sensor output generated for each of the target elements and data obtained from a calibration table, whereby each path of sight comprises a plurality of points in the optical device's three dimensional coordinate system that are linked with the associated target element's generated sensor output, whereby the data in the calibration table comprises a plurality of sensor outputs and their associated points in the optical device's three dimensional coordinate system relative to the optical device; and translate the sensor outputs for each of the four target elements into positions in the optical device's three dimensional coordinate system using the paths of sight generated for the four target elements, the set of constraining rules obtained from the captured images and data in the calibration table.

2. The system according to claim 1 wherein the calibration table was pre-generated by, positioning the optical device at a plurality of calibration positions from a target screen comprising a plurality of target centres, whereby at each calibration position, for each of the target centres on the target screen, the optical device:

captures an image of the target centre and associates, in the calibration table, a two-dimensional representation of the captured image of the target centre on the optical device's sensor with a position of the target centre relative to the optical device, the position being defined as a location in the optical device's three dimensional coordinate system, whereby the optical device's location is defined as the optical device's three dimensional coordinate system's point of origin.

3. The system according to claim 1 wherein shortest straight line distances between each of the target elements are derived from the set of constraining rules.

4. The system according to claim 3 wherein the translation of the sensor outputs for each of the four target elements into positions in the optical device's three dimensional coordinate system comprises the computing device being configured to:

identify a point on each of the paths of sight whereby each shortest straight line distance between each of the points matches with an associated shortest straight line distance as derived from the set of constraining rules; and obtain the locations of the four target elements from the identified first, second, third and fourth points.

5. The system according to claim 4 wherein the identification of a point on each of the paths of sight comprises the computing device being configured to:

a) select a first point on a first path of sight whereby the first path of sight is associated with a first target element;

b) identify a second point on a second path of sight that has a shortest straight line distance that matches with an associated shortest straight line distance as derived from the set of constraining rules from the first point, whereby the second path of sight is associated with the second target element;
c) identify a third point on a third path of sight that has a shortest straight line distance that matches with an associated shortest straight line distance as derived from the set of constraining rules from the second point, whereby the third path of sight is associated with the third target element;
d) identify a fourth point on a fourth path of sight that has a shortest straight line distance that matches with an associated shortest straight line distance as derived from the set of constraining rules from the first point, whereby the fourth path of sight is associated with the fourth target element;
e) identify a minor third point on the third path of sight that has a shortest straight line distance that matches with an associated shortest straight line distance as derived from the set of constraining rules from the fourth point, and
if the minor third point does not match with the third point, repeat steps (a)-(e) until a match is found, and when a match is found, and when a shortest distance between the first and the third point and a shortest distance between the second and the fourth point matches with associated shortest straight line distances as derived from the set of constraining rules, setting the first, second, third and fourth points as the identified points.

6. The system according to claim 3 wherein the quadrilateral polygon comprises a rectangle and the translation of the sensor outputs for each of the four target elements into positions in the optical device's three dimensional coordinate system comprises the computing device being configured to:
identify a first point on a first path of sight and a second point of a second path of sight that has a unit vector between the first and second points, that matches with a unit vector between a third point on a third path of sight and a fourth point on a fourth path of sight, whereby a shortest straight line distance between the first and the fourth point matches with an associated shortest straight line distance as derived from the set of constraining rules and whereby the first and second target elements form a first side of the rectangle and the second and third target elements form a second side of the rectangle; and
obtain the locations of the four target elements from the identified first, second, third and fourth points.

7. The system according to claim 3 wherein the set of constraining rules further comprises global locations of each of the target elements.

8. The system according to claim 7 wherein the global locations of each of the target elements are utilized to plot a first diagonal line between two of the four target elements and plot a second diagonal line between another two of the four target elements whereby a crossing point C comprises an intersection point between the first and second diagonal lines.

9. The system according to claim 8 wherein the translation of the sensor outputs for each of the four target elements into positions in the optical device's three dimensional coordinate system comprises the computing device being configured to:

select a first, second and third path of sight and identify a point on each of the three selected paths of sight, whereby each shortest straight line distance between each of the first, second and third points matches with an associated shortest straight line distance as derived from the set of constraining rules;
identify a fourth point based on a distance of the crossing point C from the first, second, third and fourth points; and
when the fourth point has an associated sensor output that matches with the fourth path of sight, obtain the locations of the four target elements from the identified first, second, third and fourth points.

10. The system according to claim 1 whereby the computing device is further configured to employ location information relative to a global coordinate system in the constraining rules to extract positioning information about the optical device relative to the global coordinate system.

11. The system according to claim 1 wherein each target element comprises a marker pattern and a signage pattern whereby,
the marker pattern further comprises a symmetrical geometrical feature whereby the feature's centre of symmetry defines a centre of the target element, and
the signage pattern further comprises a series of indicia whereby a first shape denotes a first state and a second shape denotes a second state, the first and second states being used to represent binary characters.

12. The system according to claim 11 wherein each target element's marker pattern comprises at least a first colour and the optical device is provided with a first colour sampling filter for detecting the first colour.

13. The system according to claim 2 wherein a first set of data in the calibration table was pre-generated at an ambient temperature, and at least one additional set of data in the calibration table was pre-generated at another temperature, whereby the computing device being configured to translate the sensor outputs for each of the four target elements into positions in the optical device's three dimensional coordinate system using the paths of sight generated for the four target elements, the set of constraining rules obtained from the captured images and data in the calibration table, further comprises the computing device being configured to:
compute gradients of thermal expansion based on the first and the at least one additional set of data in the calibration table;
obtain an ambient temperature of the optical device;
adjust the sensor outputs for each of the four target elements using the ambient temperature and the computed gradients of thermal expansion;
translate the adjusted outputs into the positions in the optical device's three dimensional coordinate system.

14. The system according to claim 1 wherein the optical device being configured to generate the sensor output for each of the four target elements whereby each sensor output defines the two-dimensional representation of the captured image of the target element on the optical device's sensors comprises for each sensor output, the optical device being configured to:
apply spatial interpretation to points in a region bounding points associated with the respective sensor output to define the points in decimal places if the points in the region only comprises integers.

15. The system according to claim 1 wherein the optical device being configured to generate the sensor output for each of the four target elements whereby each sensor output defines the two-dimensional representation of the captured image of the target element on the optical device's sensors comprises for each sensor output, the optical device being configured to:
- identify a shape representing a center of the target element;
- determine the geometric center of the identified shape;
- assign x-axis and y-axis vector values to edges of the identified shape; and
- determine accumulated deviations along the x-axis and y-axis using the x-axis and y-axis vector values assigned to the edges of the identified shape.

16. A method for determining, in an optical device's three dimensional coordinate system, locations of target elements within the optical device's field of view, the optical device being communicatively coupled to a computing device, the method comprising:
- capturing, using the optical device, images of four target elements whereby each target element forms a corner of a quadrilateral polygon, and obtain a set of constraining rules from the captured images, and generating a sensor output for each of the four target elements whereby each sensor output defines a two-dimensional representation of the captured image of the target element on the optical device's sensors;
- creating, using the computing device, a path of sight for each of the four target elements based on the sensor output generated for each of the target elements and data obtained from a calibration table, whereby each path of sight comprises a plurality of points in the optical device's three dimensional coordinate system that are linked with the associated target element's generated sensor output,
- whereby the data in the calibration table comprises a plurality of sensor outputs and their associated points in the optical device's three dimensional coordinate system relative to the optical device; and
- translating the sensor outputs for each of the four target elements into positions in the optical device's three dimensional coordinate system using the paths of sight generated for the four target elements, the set of constraining rules obtained from the captured images and data in the calibration table.

17. The method according to claim 16 wherein the calibration table was pre-generated by, positioning the optical device at a plurality of calibration positions from a target screen comprising a plurality of target centres, whereby at each calibration position, for each of the target centres on the target screen, the optical device:
- captures an image of the target centre and associates, in the calibration table, a two-dimensional representation of the captured image of the target centre on the optical device's sensor with a position of the target centre relative to the optical device, the position being defined as a location in the optical device's three dimensional coordinate system, whereby the optical device's location is defined as the optical device's three dimensional coordinate system's point of origin.

18. The method according to claim 16 wherein the shortest straight line distances between each of the target elements are derived from the set of constraining rules.

19. The method according to claim 18 wherein the translating of the sensor outputs for each of the four target elements into positions in the optical device's three dimensional coordinate system comprises:
- identifying, using the computing device, a point on each of the paths of sight whereby each shortest straight line distance between each of the points matches with an associated shortest straight line distance as derived from the set of constraining rules; and
- obtaining the locations of the four target elements from the identified first, second, third and fourth points.

20. The method according to claim 19 wherein the identifying the point on each of the paths of sight by the computing device comprises:
a) selecting a first point on a first path of sight whereby the first path of sight is associated with a first target element;
b) identifying a second point on a second path of sight that has a shortest straight line distance that matches with an associated shortest straight line distance as derived from the set of constraining rules from the first point, whereby the second path of sight is associated with the second target element;
c) identifying a third point on a third path of sight that has a shortest straight line distance that matches with an associated shortest straight line distance as derived from the set of constraining rules from the second point, whereby the third path of sight is associated with the third target element;
d) identifying a fourth point on a fourth path of sight that has a shortest straight line distance that matches with an associated shortest straight line distance as derived from the set of constraining rules from the first point, whereby the fourth path of sight is associated with the fourth target element;
e) identifying a minor third point on the third path of sight that has a shortest straight line distance that matches with an associated shortest straight line distance as derived from the set of constraining rules from the fourth point, and
if the minor third point does not match with the third point, repeat steps (a)-(e) until a match is found, and when a match is found, and when a shortest distance between the first and the third point and a shortest distance between the second and the fourth point matches with associated shortest straight line distances as derived from the set of constraining rules, setting the first, second, third and fourth points as the identified points.

21. The method according to claim 18 wherein the quadrilateral polygon comprises a rectangle and the translating the sensor outputs for each of the four target elements into positions in the optical device's three dimensional coordinate system by the computing device comprises:
- identifying a first point on a first path of sight and a second point of a second path of sight that has a unit vector between the first and second points, that matches with a unit vector between a third point on a third path of sight and a fourth point on a fourth path of sight, whereby a shortest straight line distance between the first and the fourth point matches with an associated shortest straight line distance as derived from the set of constraining rules and whereby the first and second target elements form a first side of the rectangle and the second and third target elements form a second side of the rectangle; and
- obtaining the locations of the four target elements from the identified first, second, third and fourth points.

22. The method according to claim 18 wherein the set of constraining rules further comprises global locations of each of the target elements.

23. The method according to claim 22 wherein the global locations of each of the target elements are utilized to plot a first diagonal line between two of the four target elements and plot a second diagonal line between another two of the four target elements whereby a crossing point C comprises an intersection point between the first and second diagonal lines.

24. The method according to claim 22 wherein the translating the sensor outputs for each of the four target elements into positions in the optical device's three dimensional coordinate system by the computing device comprises:
selecting a first, second and third path of sight and identifying a point on each of the three selected paths of sight, whereby each shortest straight line distance between each of the first, second and third points matches with an associated shortest straight line distance as derived from the set of constraining rules;
identifying a fourth point based on a distance of the crossing point C from the first, second, third and fourth points; and
when the fourth point has an associated sensor output that matches with the fourth path of sight, obtaining the locations of the four target elements from the identified first, second, third and fourth points.

25. The method according to claim 16 whereby the computing device is further configured to employ location information relative to a global coordinate system in the constraining rules to extract positioning information about the optical device relative to the global coordinate system.

26. The method according to claim 16 wherein each target element comprises a marker pattern and a signage pattern whereby,
the marker pattern further comprises a symmetrical geometrical feature whereby the feature's centre of symmetry defines a centre of the target element, and
the signage pattern further comprises a series of indicia whereby a first shape denotes a first state and a second shape denotes a second state, the first and second states being used to represent binary characters.

27. The method according to claim 26 wherein each target element's marker pattern comprises at least a first colour and the optical device is provided with a first colour sampling filter for detecting the first colour.

28. The method according to claim 17 wherein a first set of data in the calibration table was pre-generated at an ambient temperature, and at least one additional set of data in the calibration table was pre-generated at another temperature, whereby the computing device being configured to translate the sensor outputs for each of the four target elements into positions in the optical device's three dimensional coordinate system using the paths of sight generated for the four target elements, the set of constraining rules obtained from the captured images and data in the calibration table, further comprises:
computing gradients of thermal expansion based on the first and the at least one additional set of data in the calibration table;
obtaining an ambient temperature of the optical device;
adjusting the sensor outputs for each of the four target elements using the ambient temperature and the computed gradients of thermal expansion; and
translating the adjusted outputs into the positions in the optical device's three dimensional coordinate system.

29. The method according to claim 16 wherein the generating, by the optical device, the sensor output for each of the four target elements whereby each sensor output defines the two-dimensional representation of the captured image of the target element on the optical device's sensors, the method comprises, for each sensor output:
applying spatial interpretation to points in a region bounding points associated with the respective sensor output to define the points in decimal places if the points in the region only comprises integers.

30. The method according to claim 16 wherein the generating, by the optical device, the sensor output for each of the four target elements whereby each sensor output defines the two-dimensional representation of the captured image of the target element on the optical device's sensors, the method comprises, for each sensor output:
identifying a shape representing a center of the target element;
determining the geometric center of the identified shape;
assigning x-axis and y-axis vector values to edges of the identified shape; and
determining accumulated deviations along the x-axis and y-axis using the x-axis and y-axis vector values assigned to the edges of the identified shape.

* * * * *